United States Patent
Mackay et al.

(10) Patent No.: US 10,489,179 B1
(45) Date of Patent: Nov. 26, 2019

(54) VIRTUAL MACHINE INSTANCE DATA AGGREGATION BASED ON WORK DEFINITION METADATA

(71) Applicant: Amazon Technologies, Inc., Seattle, WA (US)

(72) Inventors: Eric Mackay, Lynnwood, WA (US); Sammy Zahabi, Vancouver, WA (US); Amit Neogy, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 549 days.

(21) Appl. No.: 15/195,857

(22) Filed: Jun. 28, 2016

(51) Int. Cl.
*G06F 9/455* (2018.01)
*G06F 16/13* (2019.01)
*G06F 16/16* (2019.01)
*G06F 16/23* (2019.01)

(52) U.S. Cl.
CPC .......... *G06F 9/45558* (2013.01); *G06F 16/13* (2019.01); *G06F 16/164* (2019.01); *G06F 16/2379* (2019.01); *G06F 2009/4557* (2013.01); *G06F 2009/45583* (2013.01)

(58) Field of Classification Search
CPC .... G06F 16/2379; G06F 16/164; G06F 16/13; G06F 17/30091; G06F 17/3012; G06F 17/30377; G06F 9/45558
USPC .......................................................... 707/741
See application file for complete search history.

(56) References Cited

U.S. PATENT DOCUMENTS

| | | | |
|---|---|---|---|
| 7,100,195 B1 * | 8/2006 | Underwood | G06F 9/451 726/2 |
| 8,868,506 B1 * | 10/2014 | Bhargava | G06F 16/219 707/648 |
| 9,514,155 B1 | 12/2016 | Majumdar et al. | |
| 2007/0283194 A1 | 12/2007 | Villella et al. | |
| 2011/0314148 A1 | 12/2011 | Petersen et al. | |
| 2012/0069131 A1 * | 3/2012 | Abelow | G06Q 10/067 348/14.01 |
| 2013/0152047 A1 * | 6/2013 | Moorthi | G06F 11/368 717/124 |
| 2013/0185719 A1 | 7/2013 | Kar et al. | |
| 2013/0198236 A1 * | 8/2013 | Lissack | H04L 63/0838 707/783 |
| 2014/0081685 A1 * | 3/2014 | Thacker | G06Q 10/06 705/7.12 |
| 2014/0149466 A1 | 5/2014 | Sato et al. | |

(Continued)

*Primary Examiner* — Dung K Chau
(74) *Attorney, Agent, or Firm* — Davis Wright Tremaine LLP

(57) ABSTRACT

A service provider launches an index analysis computing system instance to evaluate logs generated by a virtual computing system server to identify events encountered by the server. The index analysis computing system instance obtains, from a datastore, a data log for the virtual computing system server and uses the log to identify the events. The index analysis computing system instance identifies, based on data from the log associated with the events, tasks to be performed to obtain processor state data for the server. The index analysis computing system instance generates, based on the identified tasks, a metadata for a file, where the metadata represents the tasks to be performed. This file is transmitted to a scheduler computing system instance which can identify the tasks based on the metadata for the file.

20 Claims, 11 Drawing Sheets

(56) References Cited

U.S. PATENT DOCUMENTS

| | | | |
|---|---|---|---|
| 2014/0196038 A1* | 7/2014 | Kottomtharayil | G06F 9/505 718/1 |
| 2014/0280185 A1* | 9/2014 | Nordstrom | G06F 17/30321 707/741 |
| 2014/0282031 A1 | 9/2014 | Hinterbichler et al. | |
| 2015/0128274 A1 | 5/2015 | Giokas | |
| 2015/0172148 A1 | 6/2015 | Ishida et al. | |
| 2015/0229532 A1 | 8/2015 | Somaiya et al. | |
| 2015/0370877 A1 | 12/2015 | Bandera et al. | |
| 2017/0255639 A1* | 9/2017 | Bingham | G06F 17/30112 |

* cited by examiner

VIRTUAL MACHINE INSTANCE DATA AGGREGATION BASED ON WORK DEFINITION METADATA

CROSS REFERENCE TO RELATED APPLICATIONS

This application incorporates by reference for all purposes the full disclosure of co-pending U.S. patent application Ser. No. 15/195,773, filed concurrently herewith, entitled "VIRTUAL MACHINE INSTANCE DATA AGGREGATION."

BACKGROUND

Computing resource service providers and other service providers often evaluate data logs for their computing resources to identify and track events as they occur. For instance, customers of these service providers may want to obtain data for their computing resources to identify the underlying causes for any events that may have occurred. However, using the computer resources themselves to generate and evaluate data logs may be resource intensive, causing fewer resources to be available for a customer's use. Further, the ability to identify and track events may be difficult as monitoring systems may evaluate data logs periodically, which may delay the ability to identify and diagnose any issues with a customer's computing resources.

BRIEF DESCRIPTION OF THE DRAWINGS

Various techniques will be described with reference to the drawings, in which.

DETAILED DESCRIPTION

Figure 1:
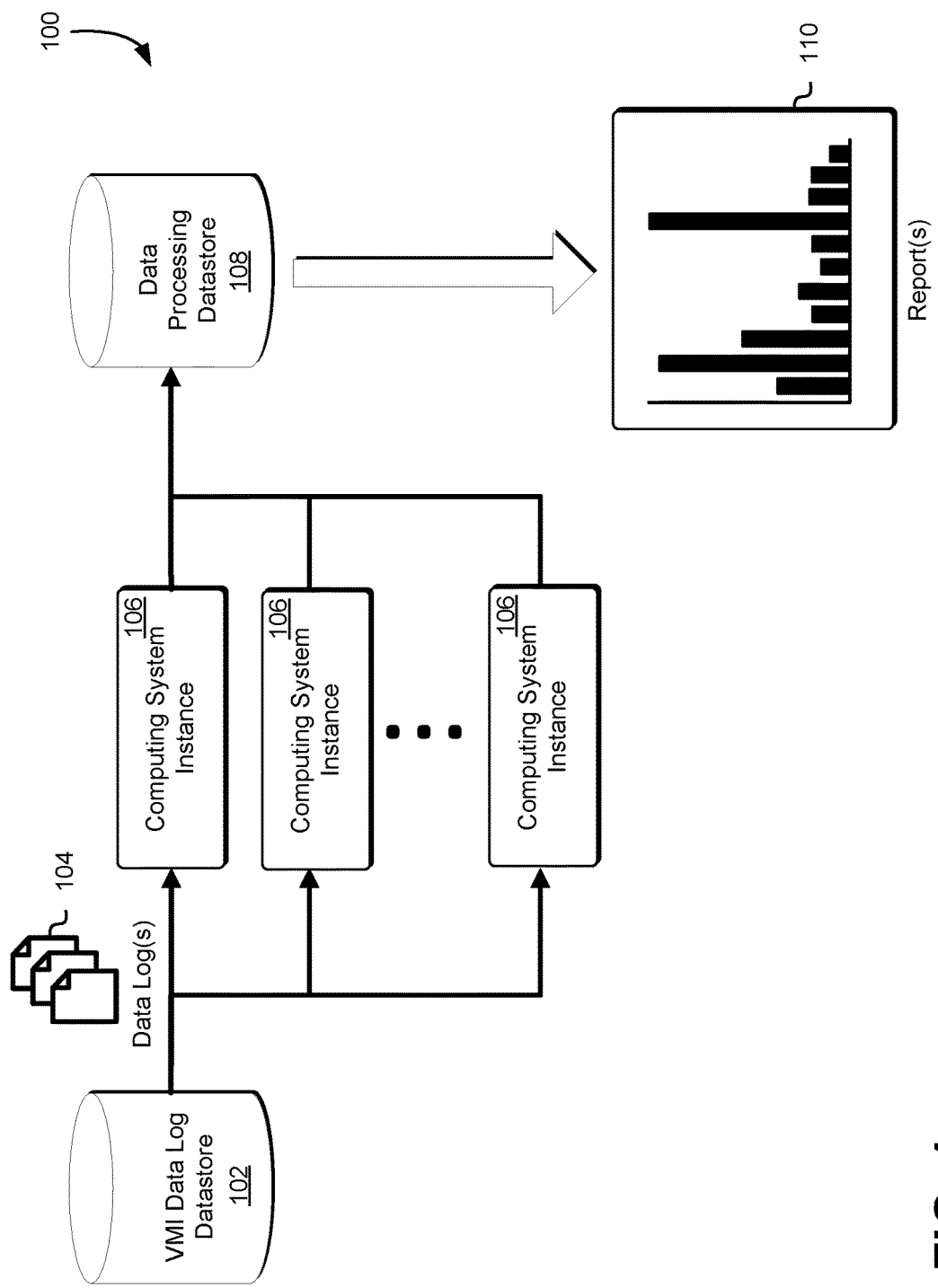
FIG. 1 shows an illustrative example of an environment in which various embodiments can be implemented.

This disclosure relates to the use of various computing resources or computing system instances, such as containers, virtual machines, or other computing system instances, to evaluate and process incoming data log files from virtual computing system servers, or resources hosting virtual computing instances, to aggregate data for these virtual servers and to identify any events. In one example, each virtual computing system server generates a variety of data logs that may be stored in a data log datastore. Additionally, a virtual computing system server may generate an index file that can be used to identify the various data logs generated by the virtual computing system server. This data log index file may be stored within a log index datastore. In response to receiving a new data log index file, the log index datastore may add a message to a log index notification subject to which an index analysis computing system instance may be subscribed. If the index analysis computing system instance detects that a new message has been added to the log index notification subject, the index analysis computing system instance may obtain the data log index file from the log index data store. The index analysis computing system instance may parse the entries in the new data log index file to identify a virtual computing system server log that may be used to identify any events for the server. If the index analysis computing system instance identifies an event for the server, the index analysis computing system instance may obtain data associated with the event and transmit this data to a diagnostics datastore where it may be sent to a data processing datastore, such as a data warehouse for processing.

In some examples, the addition of the message to the log index notification subject causes the computing resource service provider, through a container service, to launch a data log analysis computing system instance. The data log analysis computing system instance may be subscribed to the log index notification subject to obtain the new data log index file from the log index data store. The data log analysis computing system instance may evaluate the data log index file to identify any processor state data logs for the virtual computing system server that may be associated with each event identified through the index file. The data log computing system instance evaluates the logs to obtain processor state data for the virtual computing system server, which it may transmit to the diagnostics datastore for further processing and aggregation.

As the diagnostics datastore receives data associated with events and processor state data corresponding to these events, the diagnostics datastore provide the data to a data stream service, which may, in turn, transmit this data to a data processing datastore for aggregation. The data processing datastore, which may obtain data from the data stream service, may aggregate the received data associated with an event and the corresponding processor state data in order to generate a variety of reports for the event. The data processing datastore may make these reports available to customers of the virtual computer system service to enable these customers to access the reports corresponding to their virtual computing system servers. Additionally, the data processing datastore may provide these reports to other services of the computing resource service provider to enable the services to address any issues associated with the virtual computing system servers.

In an example, the index analysis computing system instance obtains the virtual computing system server data log from the data log datastore to identify data corresponding to various events for the server. Based on this data, the index analysis computing system instance may determine whether there are any tasks that are to be performed by processor state computing system instances for obtaining data associated with the identified events. If there are tasks that are to be performed, the index analysis computing system instance may generate a file having a filename that has encoded the tasks that are to be performed. For instance, the filename of the file may correspond to particular processor state logs stored within the data log datastore that are to be processed by the data log analysis computing system instances. The text analysis computing system instance may transmit this file to a delayed diagnostics datastore.

The computing resource service provider may include a schedule computing system instance that may access the delayed diagnostics datastore to obtain any files provided by the index analysis computing system instances. The scheduler computing system instance evaluates the filenames of the files from the delayed diagnostics datastore to determine tasks to be performed by the processor state computing system instances. Based on these filenames, the scheduler computing system instance may generate task definitions for each processor state computing system instance and add these task definitions to a delayed diagnostics notification subject. As the task definitions are added to the delayed diagnostics notifications subject, the addition of the task definitions may trigger the data log analysis computing system instances to launch. These data log analysis computing system instances may access the delayed diagnostics notification subject and obtain the task definitions provided by the scheduler computing system instance. The data log analysis computing system instances may use the task definitions to access the data log datastore and perform the tasks specified in the task definitions to obtain processor state data for each event.

In this manner, the computing resource service provider may detect any events that are happening across the fleet of virtual computing system servers and generate various reports corresponding to each detected event. In addition, the techniques described and suggested in this disclosure enable additional technical advantages. For instance, because the processing of data logs from the virtual computing system servers is handled by various computing system instances rather than by the virtual computing system servers themselves, resource consumption or the virtual computing system servers is reduced. This may enable the virtual computing system servers to utilize their computing resources for other tasks as defined by customers of the virtual computer system service and by other services that may utilize these virtual computing system servers.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 shows an illustrative example of an environment 100 in which various embodiments can be implemented. In the environment 100, a virtual machine instance data log store 102 may obtain one or more data logs 104 from various resources hosting virtual computing instances, such as virtual computing system servers of a virtual computer system service. For instance, each virtual computing system server of the virtual computer system service may include an agent that records data corresponding to operations performed by the virtual computing system server into one or more data logs 104. These data logs 104 may specify, among other things, processor state information for the virtual computing system server and other data that may correspond to one or more events affecting the virtual computing system server. Events may include any state transition for the virtual computing system server. For example, the agent of a virtual computing system server may specify in a data log 104 that the particular virtual computing system server has crashed. Alternatively, the agent of the virtual computing system server may specify, in a data log, that a virtual machine instance has been launched using the virtual computing system server. In some instances, the agent may specify, in the data log, that a network device has been attached to a particular virtual machine instance of the virtual computing system server. Other state transitions may include: virtual machine instance termination, networking customization for a virtual machine instance, rebooting of a virtual machine instance, cleanup of storage or attachments for the virtual computing system server, and the like. For each of these events, the virtual computing system server may generate one or more processor state logs used to record processor state information for the processors of the virtual computing system server. In an embodiment, an administrator of a virtual computing system server can transmit a request, through application programming interface (API) calls, to a virtual computer system service to provide event data and processing data for the virtual computing system server. In response to the request, the virtual computer system service may cause the virtual computing system server to generate the data logs 104.

In response to the creation of these new data logs 104, the virtual computing system server generates an index file for these data logs. The index file is a manifest of all data logs stored in the virtual machine instance data log store 102 over a particular period of time or in response to a triggering event, such as a virtual machine instance crash or detection of a launch of a virtual machine instance. In an embodiment, each virtual computing system server or the virtual computer system service transmits the index file for each virtual computing system server to a log index datastore. Further, the log index datastore may publish a message to a log index notification subject to indicate that a new log index is available within the log index datastore.

In an embodiment, for each new log index made available through the log index data store, an index analysis computing system instance is launched that may process the new log index for a virtual computing system server to identify the one or more events experienced by the virtual computing system server. The index analysis computing system instance may be subscribed to the log index notification subject such that if a new message from the log index data store is added to the subject, the index analysis computing system instance may receive a notification from the log index notification subject that a new message is available.

The index analysis computing system instance evaluates the new message to identify the new data log index for the virtual computing system server. In response, the index analysis computing system instance may access the log index data store to obtain the data log index for the virtual computing system server. In some examples, a "container instance" may refer to a computer system instance, virtual or non-virtual (e.g., a physical computer system running an operating system), that is configured to launch and run software containers, where a software container is an example of a computing system instance. In addition, the software containers may run executable code or functions that return a result to another service or component, and then terminate executing. In this way, the software containers may provide temporary or ephemeral compute capabilities that exist only to execute the specified executable code or functions, and then are terminated. Thus, the index analysis computing system instance may include virtual machines configured to launch and execute software containers for evaluating the data log index file from the data log index datastore.

The index analysis computing system instance may parse the new data log index file to identify a virtual computing system server log that may include hardware information for the virtual computing system server as well as data that may be used to identify one or more events affecting the virtual computing system server. For instance, the index analysis computing system instance may parse the virtual computing system server log to identify any domain crash events or virtual machine instance launches. The timestamp and identifier of the affected virtual machine instance may be important and combined with hardware information for the virtual computing system server. This data may be transmitted from the virtual computing system server to a diagnostics datastore, which may, in turn, provide this data to a data processing datastore 108 for aggregation. The data processing datastore 108 may analyze this data for each virtual computing system server for each virtual machine instance to prepare one or more reports 110 that may provide customers with information regarding events encountered by the virtual computing system server and any corresponding virtual machine instances.

In addition to the index analysis computing system instances, one or more data log analysis computing system instances 106 may access the log index notification subject to obtain the message published by the log index datastore. In some embodiments, the addition of a message to the log index notification subject that a new log index file has been added to the log index datastore triggers a new data log analysis computing system instance 106 to launch. Each data log analysis computing system instance 106 may correspond to each virtual computing system server that has generated a data log index file stored in the log index datastore. A data log analysis computing system instance 106 may evaluate the data log index file from the data log index data store to identify any processor state data logs 104 for its corresponding virtual computing system server. Each data log analysis computing system instance 106 may access the virtual machine instance data log datastore 102 to obtain the identified processor state data logs 104 for each event identified through the index file.

A processor state data log 104 may include several individual entries for each unprivileged domain that may have no access to the hardware of the virtual computing system server. Additionally, the processor state data log 104 may include several individual entries for each processor state change. The data log analysis computing system instance 106 may parse each processor state data log 104 corresponding to a virtual computing system server to obtain the processor state data, as well as domain data for the virtual computing system server. It should be noted that the virtual computing system server may support various virtual machine instances on behalf of customers. The data log analysis computing system instance 106 may parse each processor states data log 104 regardless of the virtual machine instance identifiers that may be specified in the log 104. However, the data log analysis computing system instance 106 may include in the data information that may be used to aggregate data according to each virtual machine instance identifier.

Each data log analysis computing system instance 106 may transmit the data obtained from the various processor state data logs 104 to a data processing datastore 108 for aggregation and analysis. The data processing datastore 108 may use the data from the data log analysis computing system instances 106, along with the data obtained from the index analysis computing system instances, to generate one or more reports 110. For instance, the data processing datastore 108 may evaluate the data from the index analysis computing system instances and the data log analysis computing system instances 106 to identify any patterns that may yield information as to a particular virtual machine instance or a virtual computing system server. For example, the data processing datastore 108 may utilize data corresponding to a virtual machine instance identifier and correlate this data with the operating system, virtual machine image used to instantiate the virtual machine instance, and the hardware information for the virtual computing system service to identify patterns that may be conducive to identifying the root causes of the events affecting the virtual machine instance and/or the virtual computing system server. The data processing datastore 108 may be a data warehouse, which allows users of the data warehouse to query for the data aggregated by the data warehouse for a virtual computing system server. Alternatively, the data processing datastore 108 may be implemented by other data storage services, such as an on-demand, object-based data storage service that processes storage requests synchronously, an archival data storage service that processes storage request asynchronously, or another data storage service. Implementation of the data processing datastore 108 may be local (i.e, with one's own computing resources) or remote (e.g., using a storage service of a computing resource service provider) or a combination of local and remote.

The data processing datastore 108 may make the reports 110 available to customers of the virtual computer system service, including those customers that have provisioned virtual machine instances using the myriad virtual computing system servers provided by the virtual computer system service. For instance, the data processing datastore 108 may transmit a notification to each administrator of the virtual computing system servers for which data was analyzed by the data processing datastore 108. This may enable an administrator to access the data processing datastore 108 and obtain the one or more data reports 110 for its virtual computing system servers and virtual machines instances. In some embodiments, the data processing datastore 108 may provide the reports 110 to one or more other services that may use the virtual computing system servers or virtual machine instances to enable these other services to analyze the reports 110 and determine what operations to be performed to address any issues corresponding to the virtual computing system servers or the virtual machine instances. For example, a computing resource service may evaluate the reports 110 to determine whether to provision a difference virtual computing system server to support functionality of its computing resources.

Figure 2:
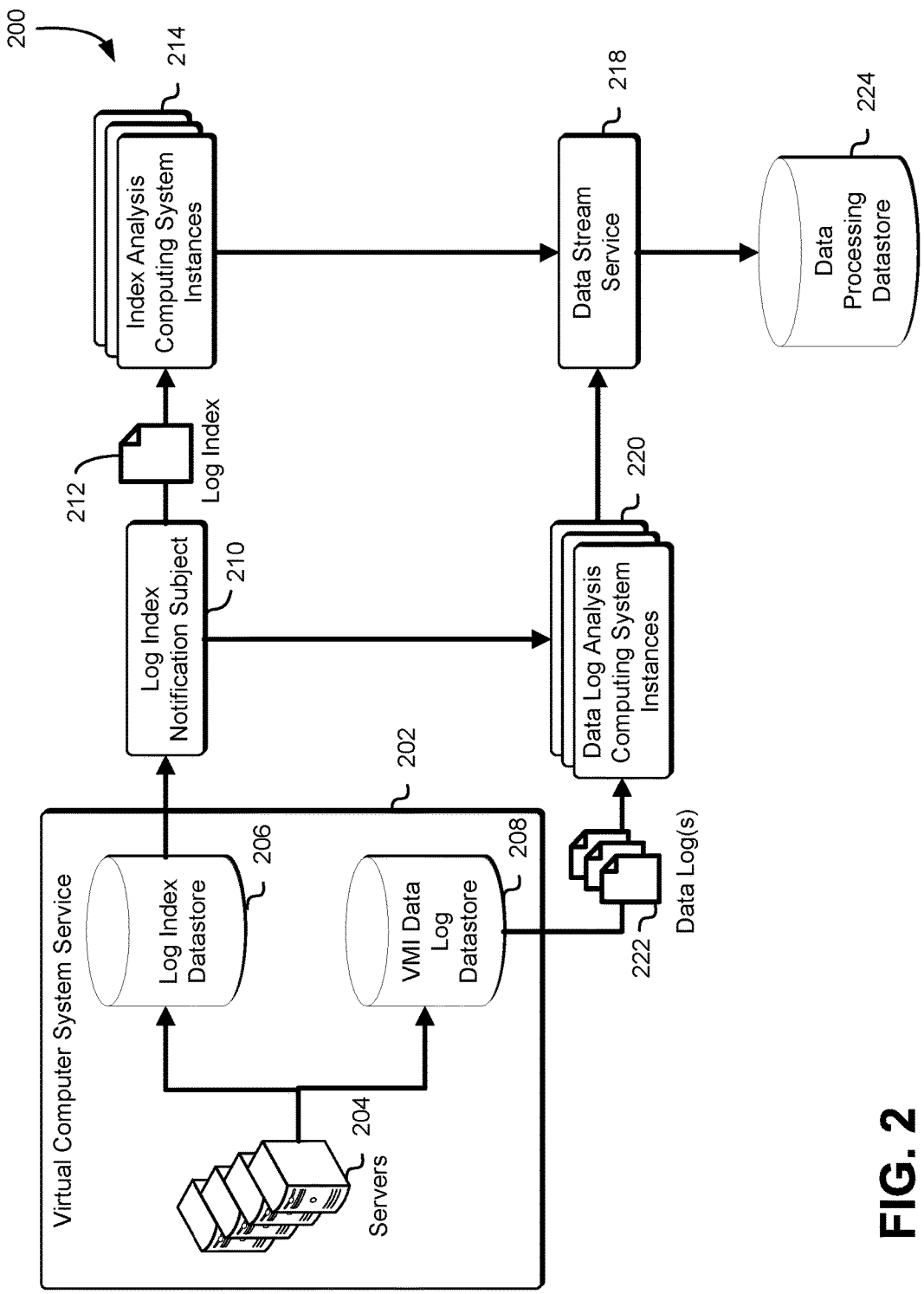
FIG. 2 shows an illustrative example of an environment in which one or more computing system instances are used to obtain data from various data logs generated by one or more virtual computer system servers in accordance with at least one embodiment.

As noted above, a variety of computing system instances may be launched to evaluate one or more data logs from a virtual computing system server to identify any events that may impact the functionality of the virtual computing system server or of any virtual machine instances that may rely on the virtual computing system server. Accordingly, FIG. 2 shows an illustrative example of an environment 200 in which one or more computing system instances are used to obtain data from various data logs 222 generated by one or more virtual computer system servers 204 in accordance with at least one embodiment. In the environment 200, the virtual computer system service 202 is a collection of computing resources configured to instantiate virtual machine instances onto virtual computer systems on behalf of the customers of the computing resource service provider. Customers of the computing resource service provider may interact with the virtual computer system service 202 to provision and operate virtual computer systems that are instantiated on physical computing devices (e.g., virtual computing system servers 204 or other resources hosting virtual computing instances) hosted and operated by the computing resource service provider. The virtual computer systems may be used for various purposes, such as to operate as servers supporting a web site. Other applications for the virtual computer systems may be to support database applications, electronic commerce applications, business applications and/or other applications.

In an embodiment, each virtual computing system server 204 generates one or more data logs 222 that may be used to track usage of the virtual computing system server 204 and any events that may be affecting the virtual computing system server 204 or any virtual machine instances that utilize the resources of the virtual computing system server 204. For instance, a virtual computing system server 204 may generate a data log if it detects that a virtual machine instance using the resources of the virtual computing system server 204 has crashed. Alternatively, the virtual computing system server 204 generates a data log if it detects that a new virtual machine instance has launched using any available resources of the virtual computing system server 204. In addition to these data logs, a virtual computing system server 204 may track state information over time for resources of the virtual computing system server 204 and any virtual machine instances operating on the server 204.

As a virtual computing system server 204 generates these one or more data logs 222, the virtual computing system server 204 may create a new data log index 212 that may be used to identify the one or more data logs created over a period of time or in response to a triggering event. The data log index 212 is a manifest of all data logs 222 generated by the virtual computing system server 204 and any other files generated by the virtual computing system server 204 that may have been transmitted to a virtual machine instance data log datastore 208. The virtual computing system server 204 may transmit the data log index 212 to a data log index datastore 206. While virtual computing system servers 204 and the virtual computer system service 202 are utilized extensively throughout the present disclosure for the purpose of illustration, other computing resources and services may generate data logs 222 for diagnostic and analytical purposes.

The virtual computer system service 202 may maintain a log index notification subject 210 which may be used by the data log index datastore 206 to provide an indication that a new data log index 212 has been added to log index datastore 206 by a virtual computing system server 204. The log index notification subject 210 may be a subject created using a notification service that may be used to publish messages to subscribers of the subject. For instance, if an entity is subscribed to the subject, in response to a new message being added to the subject, the message may be transmitted to each recipient subscribed to the subject. In an embodiment, one or more index analysis computing system instances 214 are subscribed to the log index notification subject 210 to obtain any messages added to the subject 210 that may indicate the addition of a new data log index 212 to the log index datastore 206. An index analysis computing system instance 214 may correspond to a particular virtual computing system server 204. Thus, an index analysis computing system instance 214 evaluates the message from the log index notification subject 210 to determine whether the message corresponds to its particular virtual computing system server 204. In some instances, an index analysis computing system instance 214 may process the incoming message on a first-come-first-serve basis.

In response to the message, an index analysis computing system instance 214 may access the log index datastore 206 to download the data log index 212 for a particular virtual computing system server 204. The index analysis computing system instance 214 may evaluate the data log index 212 and parse any entries of the index to identify a virtual computing system server log for the virtual computing system server 204. If the index analysis computing system instance 214 identifies the virtual computing system server log from the data log index 212, the index analysis computing system instance 214 may access the virtual machine instance data log datastore 208 to obtain the virtual computing system server log. The index analysis computing system instance 214 may parse this log to identify any domain crash events, as well as any other events affecting the particular virtual computing system server 204 and any virtual machine instances operating on the server 204. The timestamp of any identified events as well as an identifier for each affected virtual machine instances may be recorded and combined with hardware information or the virtual computing system server 204 obtained from the index 212. The index analysis computing system instance 214 may transmit this data to a data stream service 218, which may provide the data to the data processing datastore 224. The data may be collected in the form of a comma-separated value (CSV) file or other format that may be used by the data processing datastore 224 to evaluate the file.

In addition to the index analysis computing system instance 214, the computing resource service provider may launch one or more data log analysis computing system instances 220 that may be used to obtain one or more data logs 222 from the virtual machine instance data log datastore 208 to identify and collect any processor state data for the virtual computing system servers 204 that may have been affected by one or more events. For instance, if a new message is added to the log index notification subject 210 indicating that a new data log index 212 has been added to the log index datastore 206, this may trigger a new data log analysis computing system instance 220 to launch. This data log analysis computing system instance 220 may subscribe to the log index notification subject 210 and obtain the data log index 212 from the log index datastore 206 in response to the new message in the subject 210.

The data log analysis computing system instance 220 may parse this index file 212 to identify any processor state data logs that may be stored within the virtual machine instance data log datastore 208. Using this information, the data log analysis computing system instance 220 may access the virtual machine instance data log datastore 208 to obtain the processor state data logs. Each processor state data log may include various entries for each virtual machine instance operating within a virtual computing system server 204, as well as each processor state change for the virtual computing system server 204. The data log analysis computing system instance 220 may parse these data logs 222 regardless of the different identifiers for the various virtual machine instances operating within the particular virtual computing system server 204.

In an embodiment, the data log analysis computing system instance 220 transmits data obtained from various processor state data logs to a data stream service 218, which may provide the data to the data processing datastore 224 in real-time. Additionally, the data stream service 218 may provide the data from the index analysis computing system instances 214 to the data processing datastore 224. The data stream service 218 may comprise various computer systems that may access various services provided by the computing resource service provider, as well as, other computing resources to obtain data that may be streamed to a target service or resource. Additionally, the data stream service 218 may receive data from these computing resource services and other computing resources as the data is generated. While a data stream service 218 is used extensively throughout the present disclosure for the purpose of illustration, other services may be used to obtain data from various sources for the data processing datastore 224. For instance, one or more computer systems may be used to obtain data from a virtual machine instance diagnostics datastore, which may store the data from the index analysis computing system instances 214, and the data log analysis computing system instances 220. These one or more computer systems provide the data to the data processing datastore 224 over a period of time. For example, the one or more computer systems may provide the data every 24 hours or in response to a request from the data processing datastore 224 to obtain the data.

The data processing datastore 224 may aggregate the obtained data for each unique virtual machine instance identifier and for each virtual computing system server 204. Further, the data processing datastore 224 may generate, for each virtual machine instance and each virtual computing system server 204, various reports that may be used to diagnose any identified event for the virtual machine instance or the virtual computing system server 204. These reports include visual representations of the obtained data to enable customers of the virtual computer system service 202 to evaluate the data and determine a course of action to address any issues with the virtual machine instance for which the report was generated or with the virtual computing system server 204. Additionally, a customer may utilize these reports for statistical purposes.

Figure 3:
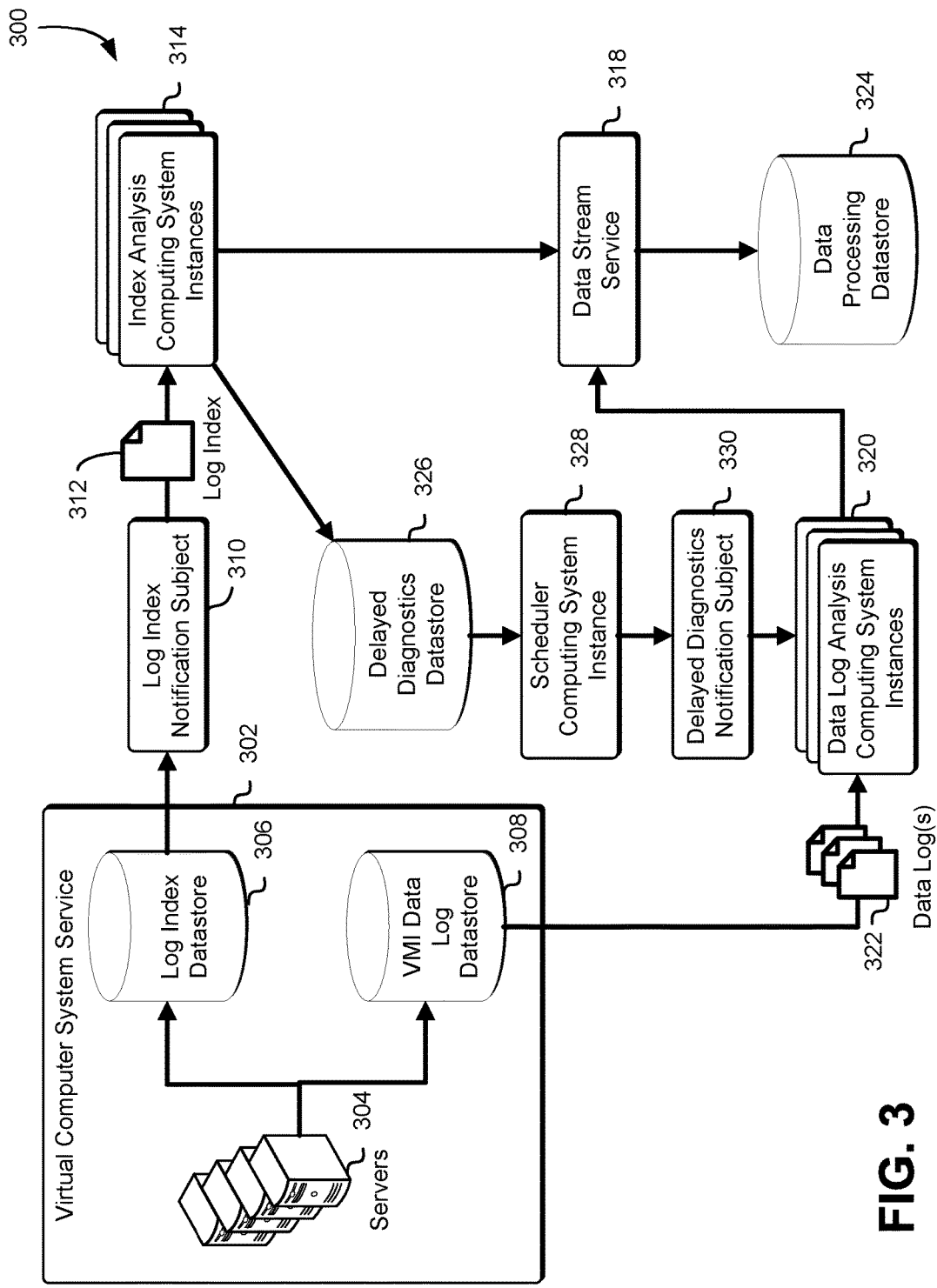
FIG. 3 shows an illustrative example of an environment in which a scheduler computing system instance evaluates filenames from files obtained from an index analysis computing system instance to determine task definitions for the data log analysis computing system instances in accordance with at least one embodiment.

In an alternative embodiment, the index analysis computing system instance evaluates the data log index to identify any tasks that may be performed by the data log analysis computing system instances in order to obtain data relating to any identified events from the virtual machine instance data log datastore. Based on the identified tasks, the index analysis computing system instance may generate a null file with a filename that can be used by a scheduler computing system instance to determine tasks to be performed. Accordingly, FIG. 3 shows an illustrative example of an environment 300 in which a scheduler computing system instance 328 evaluates filenames from files obtained from an index analysis computing system instance 314 to determine task definitions for the data log analysis computing system instances 320 in accordance with at least one embodiment. The environment 300 may include similar components to those described above in connection with FIG. 2. For instance, in the environment 300, each virtual computing system server 304 of the virtual computer system service 302, or other resource hosting virtual computing instances, generates one or more data logs 322 that may be used to track usage of the virtual computing system server 304 and any events that may be affecting the virtual computing system server 304 or any virtual machine instances that utilize the resources of the virtual computing system server 304. The virtual computing system server 304 may also create a data log index 312. The virtual computing system server 304 may transmit the data log index 312 to a data log index datastore 306. The virtual computer system service 302 may maintain a log index notification subject 310 which may be used by the data log index datastore 306 to provide an indication that a new data log index 312 has been added to log index datastore 306 by a virtual computing system server 304.

The index analysis computing system instance 314 may obtain the data log index 312 from the log index datastore 306 to evaluate the data log index 312 and parse any entries of the index to identify a virtual computing system server log for the virtual computing system server 304. The index analysis computing system instance 314 may access the virtual machine instance data log datastore 308 to obtain the virtual computing system server log for the virtual computing system server 304. The index analysis computing system instance 314 may parse the virtual computing system server log to identify any domain crash events, as well as any other events affecting the particular virtual computing system server 304 and any virtual machine instances operating on the server 304. The timestamp of any identified events as well as an identifier for each affected virtual machine instances may be recorded and combined with hardware information or the virtual computing system server 304 obtained from the index 312. The index analysis computing system instance 314 may transmit this data to the data stream service 318, which may transmit the data to the data processing datastore 324. Alternatively, the index analysis computing system instance 314 may transmit the data to a virtual machine instance diagnostics datastore, which may collect the data for delivery to the data processing datastore 324.

In an embodiment, based at least in part on the events identified through the virtual computing system server log, the index analysis computing system instance 314 determines what tasks remain to be performed to obtain data associated with these events. For instance, the index analysis computing system instance 314 may identify, based at least in part on the data log index 312, whether there are any processor state data logs associated with the identified events or the virtual computing system server 304 or any virtual machine instances that utilize the virtual computing system server 304. The index analysis computing system instance 314 may evaluate a database of known tasks to identify a code that may be used as a filename for a null file that may be used to indicate the tasks to be performed by the data log analysis computing system instances 320. The database may include a lookup table that may include key-value pairs for filenames and tasks. Thus, based at least in part on the tasks identified by the index analysis computing system instance 314, the index analysis computing system instance 314 may generate a null file (e.g., empty file) that includes a filename that can be used to determine what tasks are to be performed. The index analysis computing system instance 314 may transmit this file to a delayed diagnostics datastore 326, which may include various files having filenames that can be used to determine the tasks to be performed. The delayed diagnostics datastore 326 may be a logical partition of a storage system that is used to define one or more tasks to be performed at a later time by the data log analysis computing system instances.

As a new file is added to the delayed diagnostics datastore 326, the scheduler computing system instance 328 may receive a notification from the delayed diagnostics datastore 326 indicating that a new file has been added to the delayed diagnostics datastore 326. The scheduler computing system instance 328 may access the delayed diagnostics datastore 326 to obtain the new file provided by the index analysis computing system instance 314. Further, the scheduler computing system instance 328 may evaluate the filename of the obtained file to determine the tasks that need to be performed by the data log analysis computing system instances 320 to obtain additional data for a particular event identified by the index analysis computing system instance 314. The scheduler computing system instance 328 may access the database of known tasks and, using the filename of the obtained file, identify the tasks that are to be performed. Using this information, the scheduler computing system instance 328 may generate a task definition file for the data log analysis computing system instances 320 and generate a message indicating that a new task definition file has been generated.

The scheduler computing system instance 328 may publish the message to a delayed diagnostics notification subject 330, which may be a subject created using a notification service that may be used to publish messages to subscribers of the subject. If a new message is added to the delayed diagnostics notification subject 330 indicating that a new task definition file has been created by the scheduler computing system instance 328, this may trigger a new data log analysis computing system instance 320 to launch. This data log analysis computing system instance 320 may subscribe to the delayed diagnostics notification subject 330 and obtain the task definition file from the scheduler computing system instance 328 in response to the new message in the subject 330.

The data log analysis computing system instance 320 may evaluate the task definition file from the scheduler computing system instance 328 to identify which data logs 322 the data log analysis computing system instance 320 is to obtain from the virtual machine instance data log datastore 308. The data log analysis computing system instance 320 may access the virtual machine instance data log datastore 308 to obtain the identified data logs 322. The data log analysis computing system instance 320 may parse these data logs 322 according to the task definition file and transmit the data obtained from these data logs 322 to the data stream service 318, which may provide the data to the data processing datastore 324 in real-time. Additionally, the data stream service 318 may obtain the data from the index analysis computing system instance 314 to provide this data to the data processing datastore 324. The data processing datastore 324 may aggregate the obtained data for each unique virtual machine instance identifier and for each virtual computing system server 304 to generate various reports that may be used to diagnose any identified event for the virtual machine instance or the virtual computing system server 304.

Figure 4:
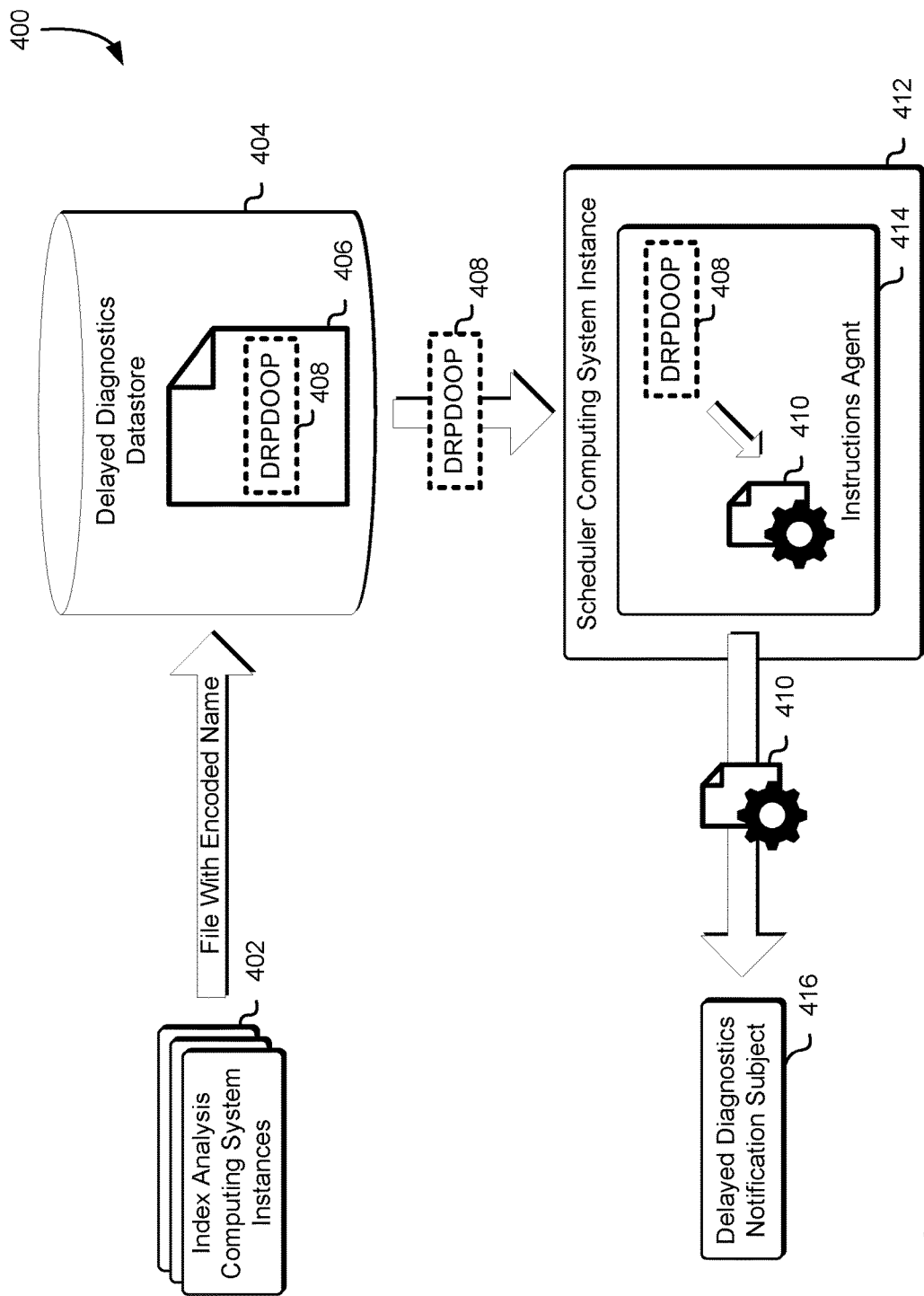
FIG. 4 shows an illustrative example of an environment in which a scheduler computing system instance evaluates a filename to determine the operations to be performed in obtaining data from one or more data logs in accordance with at least one embodiment.

As noted above, an index analysis computing system instance may evaluate a data log index from a log index datastore of a virtual computer system service to identify any events encountered by a virtual computing system server and any virtual machine instances operating using the resources of the virtual computing system server. Based at least in part on the information specified in the data log index, the index analysis computing system instance may identify what tasks need to be performed to obtain data corresponding to these events. The index analysis computing system instance may use these tasks to generate a filename that has encoded within it the tasks that can be performed by a data log analysis computing system instance to obtain the necessary data. Accordingly, FIG. 4 shows an illustrative example of an environment 400 in which a scheduler computing system instance 412 evaluates a filename 408 to determine the operations to be performed in obtaining data from one or more data logs in accordance with at least one embodiment.

In the environment 400, the index analysis computing system instances 402 may each analyze their respective data log index files from the log index datastore to identify any virtual computing system server logs for their respective virtual computing system servers and virtual machine instances. Each index analysis computing system instance 402 may evaluate a virtual computing system server log to identify any events encountered by the corresponding virtual computing system server and/or the virtual machine instances instantiated on to the virtual computing system server. Based at least in part on the events identified, the index analysis computing system instance 402 may identify any tasks that need to be performed to obtain additional data for these events. For instance, through the data log index file and the virtual computing system server log, the index analysis computing system instance 402 may identify the one or more data logs stored within the virtual machine instance data log datastore that are to be analyzed, as well as the types of data that are to be obtained from these data logs.

The index analysis computing system instance 402 may access a database of tasks to generate a filename 408 for a null file 406 that may be used to indicate the tasks that are to be performed by a data log analysis computing system instance to obtain the data for the identified events. The database of tasks may be a key-value store that specifies, for each character of a filename 408, a task to be performed. Alternatively, the index analysis computing system instance 402 may generate a distinct filename 408 and specify, within the database, the tasks to be performed. The index analysis computing system instance 402 may create an association between the filename 408 and the tasks to be performed within the database. In some embodiments, the scheduler computing system instance 412 may include a key-value store for filenames 408 and corresponding tasks to be performed, obviating the need for a centralized database of key-value pairs.

The filename 408 may be encoded to identify the tasks to be performed by a data log analysis computing system instance, as well as other information that may be used to associated the data to the corresponding virtual computing system server. For instance, the filename 408 may encode an identifier for a virtual machine instance operating through the virtual computing system server, the date/time of the events that the processor state data log corresponds to, a hash code identifier for the virtual computing system server, the date/time at which the task may be performed, and an identifier for the virtual computing system server. As will be described in greater detail below, the instructions agent 414 of the scheduler computing system instance 412 may parse the filename 408 to obtain the encoded information and to use this information to prepare the task definitions file 410.

The index analysis computing system instance 402 may generate a null file 406 (e.g., file having no contents) that has a filename 408 in which are encoded the tasks to be performed by a data log analysis computing system instance. The index analysis computing system instance 402 may store this null file 406 within a delayed diagnostics datastore 404. In response to receiving the new null file 406, the delayed diagnostics datastore 404 may update an index of the delayed diagnostics datastore 404 to indicate that the null file 406 has been added to the delayed diagnostics datastore 404. The index may specify the filenames for each file stored within the delayed diagnostics datastore 404, as well as a timestamp indicating when a file was added to the delayed diagnostics datastore 404. In an embodiment, the delayed diagnostics datastore 404 may transmit a notification to the scheduler computing system instance 412 to indicate that the index has been updated to specify presence of a new null file 406 in the delayed diagnostics datastore 404. In response to the notification, an instructions agent 414 of the scheduler computing system instance may obtain the index from the delayed diagnostics datastore 404 to obtain the filename 408 of the newly added null file 406. The instructions agent 414 may be a software application launched automatically when the scheduler computing system instance 412 is instantiated.

The instructions agent 414 may evaluate the filename 408 of the null file 406 specified in the index to identify the one or more tasks that need to be performed by a data log analysis computing system instance to obtain data associated with one or more identified events. For instance, the instructions agent 414 may access the database of tasks and utilize the filename 408 to identify the one or more tasks to be performed. Alternatively, the instructions agent 414 may be programmed to decode the filename 408 to identify the tasks and an ordering in which the tasks are to be performed. Using the tasks identified through the database or through use of its programming, the instructions agent 414 may generate a new task definitions file 410 that may specify the one or more tasks to be performed. Additionally, the task definitions file 410 may specify an ordering in which the one or more tasks are to be performed.

The instructions agent 414 may transmit the task definitions file 410 to the delayed diagnostics notification subject 416. Alternatively, the instructions agent 414 may generate a message that specifies that the new task definitions file 410 is available through the scheduler computing system instance 412. The addition of the task definitions file 410 or the message to the delayed diagnostics notification subject 416 may trigger a data log analysis computing system instance to be launched. This data log analysis computing system instance may be subscribed to the delayed diagnostics notification subject 416. Thus, the data log analysis computing system instance may receive a notification from the delayed diagnostics notification subject 416 indicating that the new task definitions file 410 has been added to the subject 416 or that the new task definitions file 410 is available through the scheduler computing system instance 412. Under either circumstance, the data log analysis computing system instance may obtain the task definitions file 410 and determine the tasks to be performed.

While filenames are used extensively throughout the present disclosure for the purpose of illustration, other data may be included in the file 406 to encode to one or more tasks that can be used to generate the task definitions file 410. For instance, the file 406 may include metadata that describes the file 406 and also encodes the one or more tasks and other information that can be used to generate the task definitions file 410. The instructions agent 408 may evaluate the metadata of the file 406 to identify the one or more tasks to be performed and to generate the task definitions file 410.

Figure 5:
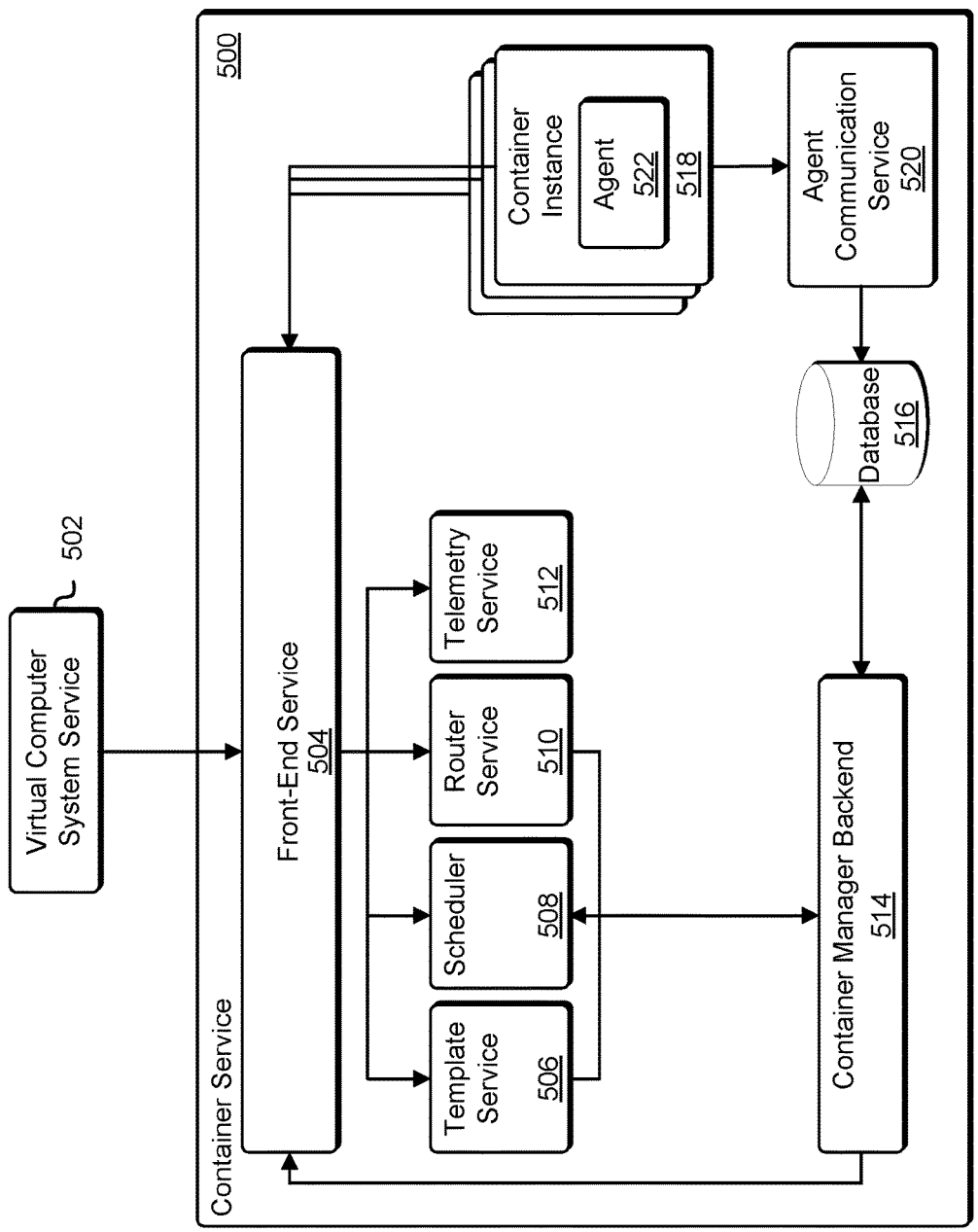
FIG. 5 shows an illustrative example of a container service in accordance with at least one embodiment.

As noted above, container instances may refer to computer system instances, virtual or non-virtual (e.g., a physical computer system running an operating system), that are configured to launch and run software containers, where containers are examples of computing system instances that can perform operations such as described above and also below. In addition, the software containers may run executable code or functions that return a result to another service or component, and then terminate executing. Accordingly, FIG. 5 shows an illustrative example of a container service 500 in accordance with at least one embodiment. As illustrated in FIG. 5, the environment of the example container service 500 may include a virtual computer system service 502 communicating through a front-end service 504 to manage one or more containers within one or more container instances 518. In some examples, a "container instance" may refer to a computer system instance, virtual or non-virtual (e.g., a physical computer system running an operating system), that is configured to launch and run software containers (referred to in short as "containers." Thus, the one or more container instances 518 may be virtual machines configured to launch and execute software containers.

A container encapsulation system provided by or interfaced to the container service 500 may allow a user (e.g., user of a controlling device) to configure one or more applications within a container of an operating system which supports containers. The running processes and resources within the container may be isolated from other processes of the parent container instance and from the running processes and resources within other containers of the same host system. The user may specify the amount of memory and processing capacity allocated to the container. The base container and the applications and data within it may then be packaged as an image, including one or more programs, data, and any system dependencies (e.g., libraries, files, etc.) that are needed for the programs to run on the operating system of the container instance. In some examples, an "image" may refer to an entire copy of a particular state of the base container at the time the image was generated. The image thereafter may be used to launch one or more identical containers, each of which may be assigned the specified amount of resources and may be isolated from each other. The containers may be launched on the same or different physical machines and each container may be expected to run in exactly the same way as the base container.

Each of the container instances 518 may be configured to contain one or more agents, such as the agent 522. The container service 500 may be comprised of a set of services, including a template service 506, one or more schedulers 508, a router service 510, and a telemetry service 512. Because the container service 500 may be configured as a multitenant service (i.e., the resources of the container service 500 may serve multiple customers concurrently), and because the services provided by the container service 500 exist outside and separate from the container instances 518, the virtual computer system service 502 need not install individual software applications within its respective container instances 518 to provide the functionality afforded by the services. The virtual computer system service 502 may utilize the functionality provided by these services by making web service application programming interface function calls through the front-end service 504, which may be configured to receive requests from the virtual computer system service 502 and forward the requests to the appropriate service, such as the appropriate container manager backend service 514.

The scheduler 508 may be configured to launch tasks within the described cluster. Alternatively, the virtual computer system service 502 may implement its own scheduler, rather than the scheduler 508. The virtual computer system service 502 may design and/or upload a placement algorithm to be used by its own scheduler, or may select from a list of possible placement algorithms provided to the virtual computer system service 502 by the computing resource service provider. The container service 500 may determine, based on available resources, whether to accept or reject placement decisions made by the virtual computer system service 502 scheduler.

The scheduler 508 may be a multitenant service configured to optimally schedule a set of tasks to run with a cluster. In this way, virtual computer system service 502 need not choose where the tasks should be executed. The placement scheme of the scheduler 508 may be configured to distribute tasks evenly over the cluster (e.g., round robin fashion, stochastic distribution scheme, etc.), and may be configured to distribute tasks based on a current or projected resource consumption by the cluster, in order to make the most efficient use of available resources. The scheduler 508 may obtain cluster manager metadata and other information about the availability of the container instances 518 in a cluster via the container manager backend services 514. The cluster manager metadata and other information may include data about the current state of the container instances 518 assigned to the cluster, available resources within the container instances, containers running within the container instances, and other information usable by the scheduler 508 to make placement decisions.

The scheduler 508 may distribute tasks based on security rules, security groups, and/or security roles, have affinity, and anti-affinity. For example, tasks within a certain security group may be configured to be launched on the same container instance whenever possible or practicable, or, conversely, may be scheduled to be launched in separate container instances. As another example, tasks may be assigned to certain security groups or designated to have certain security roles, and, based on the particular security group assigned or security role designated, a task may be assigned to run in a specific cluster or specific cluster instances or may have priority for resources over other tasks. Task distribution based on affinity/anti-affinity include assigning "tags" indicating relationships between containers, container instances, and tasks. As an example of distribution based on affinity, two container instances may be tagged as "general" and one container instance may be tagged as "database." In a task definition, a task could be specified with a "general" launch constraint providing affinity that the task is to be launched into one (or more) of the container instances tagged as general. As an example of task distribution of anti-affinity, certain container instances may be tagged as "secure-credit-card-processing" and certain other container instances may be tagged as "http-website." Because http-website containers may be serving traffic from untrusted outside entities, it may be desirable not to share such containers with credit card processing tasks. Thus, a task definition can be configured to indicate that "http-website" is anti-affinity to credit card processing tasks to ensure that credit card processing containers are not launched in "http-website" tagged container instances. In this example, the scheduler 508 can be configured to parse any tags in a task definition and use it to filter out container instances that do not meet the criteria associated with the tag. Next, the scheduler 508 can select a container instance from the filtered set to host the container.

Containers may also be configured to utilize other resources provided by the computing resource service provider. For example, each container may be configured with a virtual network interface to allow the container to communicate through the virtual network to other containers and/or other resources of the computing resource service provider. Likewise, security credentials may be assigned on a per-container basis so that containers have their own security credentials to access the other resources provided by the computing resource service provider. Additionally, the container service may be configured to integrate with a load-balancing service to load-balance workloads directed at the containers. For example, a virtual computer system service 502 may present a list of communications protocol addresses associated with virtual networks of the virtual computer system service 502 containers and/or virtual computer system service 502 instances to a load-balancer of the load-balancing service and instruct the load-balancer to balance workloads between the communications protocol addresses. In addition, the container service may be integrated with an auto-scaling service to allow resources utilized by the containers to be dynamically adjusted as needed.

In some cases, the scheduler 508 may be configured to maximize available resources. For example, a cluster may be utilized primarily for running long-running services, and a need arises for running one or more short-lived batch jobs. In such an example, a scheduler configured to maximize available resources may look for an instance with just enough processing power to support the batch jobs as a best-fit location for the batch jobs. Alternatively, the scheduler 408 may look for an instance utilizing the least of its processing power and schedule the batch jobs with this instance.

In some implementations, a meta-scheduler is configured to run hierarchically on top of one or more schedulers, and the meta-scheduler may decide where to launch the batch jobs. For example, in an implementation there are two types of tasks: short term batch job tasks and long-term services. The two types of tasks may have different placement rules, such as it may be desirable to distribute the service tasks evenly among the available container instances in one or more specified clusters, whereas the batch job tasks may be configured to run in any available container instance with space processing cycles. In some cases, a different scheduler may be assigned to each set of placement rules. However, in cases where such placement rules are competing or in conflict with each other or in cases where an appropriate scheduler must be determined and assigned to a particular task, the meta-scheduler may determine which competing task should prevail, synchronize information between schedulers, or determine the appropriate scheduler for placing a task.

Because containers may be run in any available container instance with sufficient resources in the cluster, containers may be scaled up or down within the cluster as needed, provided enough container instances are available. If the number of container instances in a cluster is insufficient, additional container instances may be created and registered to the cluster through the cluster manager. If an overabundance of container instances exist in the cluster, some container instances may be deregistered from the cluster via the cluster manager. The scheduler 508 may also be configured to start tasks within a task definition file, and determine where to place the tasks within the cluster. For example, the scheduler 508 may determine to distribute tasks evenly between the container instances of the cluster, distribute tasks in some chi-squared distribution, or may distribute tasks among container instances of a cluster according to some other heuristic or set of constraints.

The template service 506 may be configured to allow the virtual computer system service 502 to define a task definition for its containers. In some examples, a "task definition" may refer to a script or set of metadata that may define a group of containers; e.g., the number of containers, their types, their components, their relationships to other containers, information describing associated instances, and other metadata. Task definitions may also specify that groups of containers are to be launched in coordination. The template service 506 may receive task definitions from the virtual computer system service 502, store the task definitions in the database 516, and allow the network-connected device service 502 to create, view, update, delete, and otherwise manage their task definitions.

The template service 506 may grant the virtual computer system service 502 the ability to define a task definition. The template service 506 may allow the virtual computer system service 502 with the ability to provide the task definition by uploading a task definition file or may provide the task definition by allowing the virtual computer system service 502 to select from various options and/or change default settings to dynamically create a task definition file. The template service 506 may allow the virtual computer system service 502 to register a task definition. The template service 506 may also provide an editing interface for editing currently registered task definitions. The template service 506 may register the task definitions at least in part, by providing the task definitions to the container manager backed service 514 to be stored in in the database 516.

In some examples, a "fleet" may refer to a set of computer systems (virtual or physical) running instances, such as the container instances 518 of the present disclosure. A fleet may be subdivided into sub-fleets, and each sub-fleet may be supported by a corresponding container manager back-end service and agent communication service dedicated to that sub-fleet. The agent communication services 520 may be configured to communicate with the agents 522 running on container instances within the sub-fleet.

The container manager backend services 514 may be configured to provide other management services and resources to the sub-fleet on the backend, such as the cluster management software or cluster manager metadata described in the present disclosure. The container manager backend services may be configured to receive task definitions from the template service 506, store the task definitions in the database 516, receive cluster manager metadata from container instances 518 or the agent communication services 520, and provide task definition information and the cluster manager metadata to the scheduler 508 or a network-virtual computer system service 502 installed scheduler upon request. The container manager backend services may be configured to provide information about a specified cluster, such as cluster manager metadata.

The agent communication services 520 and container manager backend services 514 may be implemented on separate computer systems within the sub-fleet, separate virtual machine instances within the sub-fleet, may share the same computer systems and/or virtual machine instances within the sub-fleet, or may run on computer systems separate from but in communication with their respective sub-fleet. There may be multiple container instances 518 per sub-fleet. In some cases, each sub-fleet may represent a single cluster. In other cases, clusters may span multiple sub-fleets. In still other cases, each sub-fleet may host more than one cluster. The router service 510 may be configured to route requests from the front-end service 504 to the appropriate sub-fleet. In some embodiments, the router service 510 route requests to a single sub-fleet. In other embodiments, the router service routes requests between multiple sub-fleets.

The telemetry service 512 may be configured to aggregate control group metrics (e.g., information about the processes running within the containers) and container logs and provide the aggregated metrics and logs to a resource monitoring service to allow the virtual computer system service 502 to monitor resource utilization, such as processor, storage, and network usage, of their respective container instances. Control group metrics include information such as the amount of memory used by processes of the containers, number of times that a process triggered a page fault, central processing unit usage by the processes of the containers, time during which the central processing units were executing system calls on behalf of processes of the containers, number of reads and writes by the processes of the containers, and number of input/output operations queued for the processes of the containers. In some implementations, telemetry service 512 may obtain its data directly from one or more agents, such as the agent 522. In other implementations, the telemetry service 512 may obtain its data indirectly from one or more agents, such as through the front-end service 504 or through a connection (not shown) to the database 516.

The container manager backend services 514 may be configured to receive placement requests from the virtual computer system service 502 for its containers through the front-end service 504, and may ensure that the requested resources are available for the containers. The container manager backend services 514 may then write the desired container state to the database 516. In some implementations, the container manager backend services is responsible for the cluster manager metadata, which may be stored in the database 516, and provided to the scheduler 508 or customer-installed scheduler when requested.

The database 516 may be a data store located within the distributed computing system of the container service 500, or may be a data store of a different service of a computing resource service provider, such as a relational database service. In some embodiments, the database 516 is a set of distributed databases that share a transaction log. The agent communication services 520 may be configured to store the status of the agents 522 and/or other information provided by the agents 522 to the agent communication service 520 in the database 516. In some embodiments, communication by other components of the container service, with containers and the container instances 518 is performed through the agent communication services 520. Each fleet may have at least one agent communication service which relays the messages between the agents 522 of the fleet.

The agents 522 may be software applications configured to run in instances owned by the virtual computer system service 502 and may track communications (e.g., packets, requests, messages, etc.) between applications running in software containers of the container instances 518. The agents 522 themselves may be running within software containers. The agents 522 may be configured to launch automatically when their respective container instances 518 are instantiated. In an embodiment, an agent 522 operating within a container instance 518 access data log files from various datastores of the virtual computer system service 502 to identify events encountered by various virtual computing system services and virtual machine instances, as well as other data associated with these events.

The container service 500 may be integrated with other services of a computing resource service provider, such as the virtual computer system service 502. For example, the container instances may be tagged and/or assigned to an auto-scaling group of an auto-scaling service of the computing resource service provider. In this manner, the auto-scaling service may monitor resource usage by the container instances and may dynamically adjust/allocate resources as needed, such as a sudden increase in resource demand by the container instances. Likewise, the container service 500 may integrate with a load-balancer service of the computing resource service provider. For example, the load-balancer service may distribute traffic to the containers or container instances in order to balance the workload among the container instances.

Figure 6:
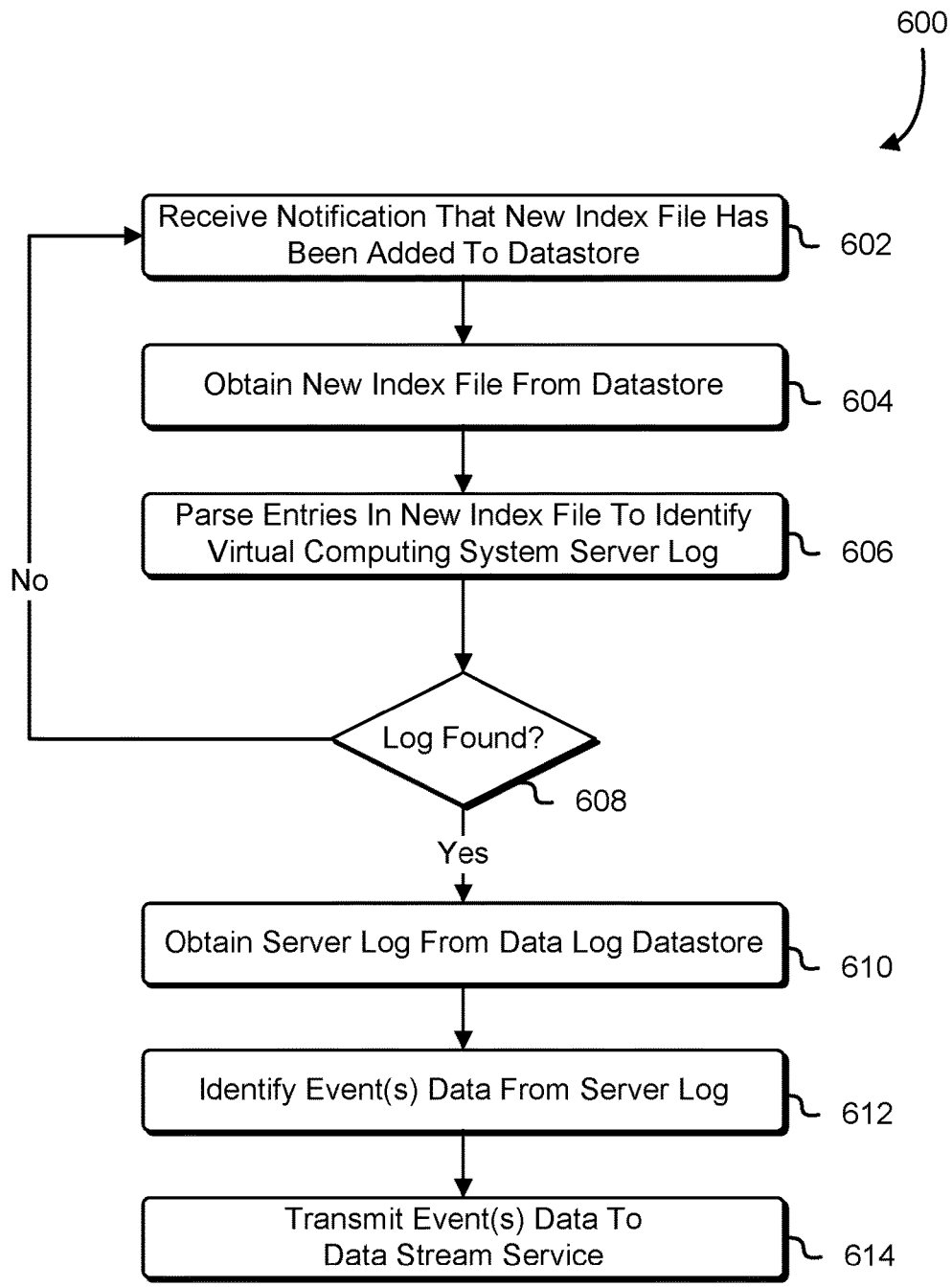
FIG. 6 shows an illustrative example of a process for parsing an index file to identify a server log that can be used to obtain event data that can be provided to a diagnostics datastore in accordance with at least one embodiment.

As noted above, an index analysis computing system instance may be subscribed to the log index notification subject to determine whether a new data log index has been added to a log index datastore for a particular virtual computing system server. The index analysis computing system instance may obtain this data log index from the log index datastore to identify any events affecting the virtual computing system server and to provide event data for each event to the data stream service for delivery to the data processing datastore. Accordingly, FIG. 6 shows an illustrative example of a process 600 for parsing an index file to identify a server log that can be used to obtain event data that can be provided to a diagnostics datastore in accordance with at least one embodiment. The process 600 may be performed by an index analysis computing system instance, which may utilize notifications from a log index notification subject to identify if a new data log index is available for a particular virtual computing resource server. In some instances, the virtual computer system service may maintain a fleet of index analysis computing system instances, each of which may be assigned to an individual virtual computing system server. Alternatively, the virtual computer system service may configure the index analysis computing system instances to process incoming messages from the log index notification subject on a first-come-first-serve basis.

In an embodiment, the index analysis computing system instance is subscribed to a log index notification subject to receive 602 notifications from the log index notification subject indicating that a new index file has been added to the log index datastore of the virtual computer system service. For instance, the log index datastore of the virtual computer system service may publish a notification to the log index notification subject to indicate that a new data log index file has been added to the log index datastore. The index analysis computing system instance may obtain the notification from the log index notification subject and identify the new index file added to the log index datastore. The index analysis computing system instance may utilize this information to access the log index datastore to obtain 604 the new index file.

The index analysis computing system instance may parse 606 the entries of the new index file to identify a virtual computing system server log that may be stored within a virtual machine instance data log datastore. The new index file may specify hardware information for the particular virtual computing system server and the hardware used to instantiate the virtual machine instances on to the virtual computing system server. The virtual computing system server log may specify event data for the one or more events encountered by the virtual computing system server and its corresponding virtual machine instances. In some instances, no events may be detected and, as a result, no virtual computing system server log may be indicated in the index file. Thus, using the index file, the index analysis computing system instance may determine 608 whether a virtual computing system server log is specified in the index file and is thus available for analysis. If the index analysis computing system instance is unable to identify a virtual computing system server log from the new index file, the index analysis computing system instance may await the next notification indicating presence of a new index file for the virtual computing system server.

If the index analysis computing system instance identifies, through the index file, a virtual computing system server log that is stored within the virtual machine instance data log datastore, the index analysis computing system instance may access the datastore to obtain 610 the virtual computing system server log. The index analysis computing system instance may parse the log to identify 612 any events that may have been encountered by the virtual computing system server and/or any of the virtual machine instances that utilize the virtual computing system server. If the index analysis computing system instance identifies any events, the index analysis computing system instance may obtain data corresponding to each of these events, including the timestamp at which the event occurred and an identifier for each virtual machine instance that encountered the event.

The index analysis computing system instance may combine the data corresponding to each of these events with the hardware information specified in the index file into a format, such as a CSV format, that may be evaluated by a data processing datastore to generate one or more reports for customers of the virtual computer system service. The index analysis computing system instance may transmit 614 the combined data, including the event data for each event, to the data stream service. This may cause the data stream service to provide the data to the data processing datastore to enable the data processing datastore to utilize the event data, along with processor state data for the virtual computing system server, to generate one or more reports for customers of the virtual computer system service.

Figure 7:
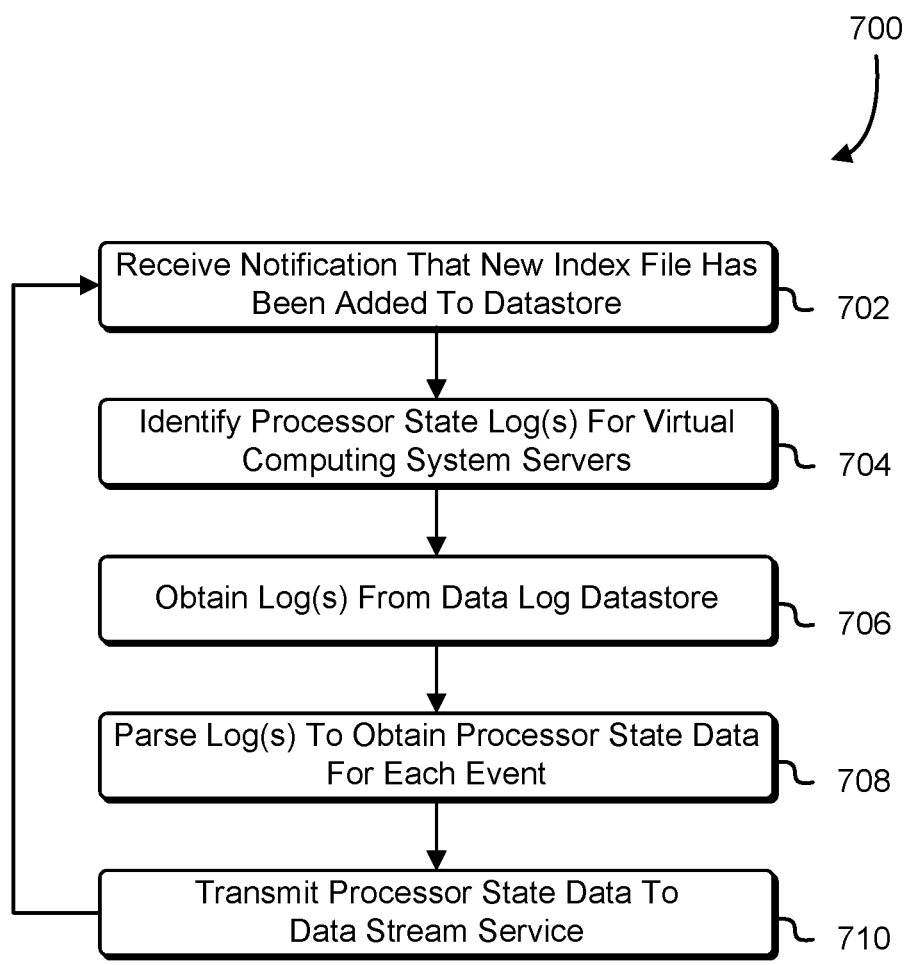
FIG. 7 shows an illustrative example of a process for parsing processor state logs to obtain processor state data for each identified event for the virtual computing system servers in accordance with at least one embodiment.

As noted above, one or more data log analysis computing system instances may also be subscribed to the log index notification subject to determine if a new data log index has been added to the log index datastore. If a data log analysis computing system instance receives a new notification indicating that a data log index file has been added to the log index datastore, the data log analysis computing system instance may identify the one or more processor state data logs stored within the virtual machine instance data log datastore that correspond to the obtained data log index file. The data log analysis computing system instance may process these one or more processor state data logs and provide the data from these logs to a data stream service for distribution to the data processing datastore 224 for aggregation and generation of reports. Accordingly, FIG. 7 shows an illustrative example of a process 700 for parsing processor state logs to obtain processor state data for each identified event for the virtual computing system servers in accordance with at least one embodiment. The process 700 may be performed by a data log analysis computing system instance, which may access a virtual machine instance data log datastore of the virtual computer system service to obtain the processor state data logs for processing.

In an embodiment, in response to a new notification being added to the log index notification subject indicating presence of a new data log index file in the log index datastore, the virtual computer system service launches a new data log analysis computing system instance that may be used to process the data log index file. The new data log analysis computing system instance may subscribe to the log index notification subject to receive 702 the notification, from the log index notification subject, indicating that a new index file has been added to the log index datastore. In response to the notification, the data log analysis computing system instance may access the log index datastore of the virtual computer system service to obtain the new data log index file for a virtual computing system server.

The data log analysis computing system instance may parse the index file from the log index datastore to identify 704 one or more processor state data logs that may be stored within the virtual machine instance data log datastore. The data log analysis computing system instance may access the virtual machine instance data log datastore to obtain 706 the one or more identified processor state data logs specified in the data log index file. The data log analysis computing system instance and decompress each of the obtained processor state data logs and parse 708 through these processor state data logs to obtain processor state data for each identified event specified in the index file. Each processor state data file may comprise several individual entries for each domain operating on the virtual computing system server and for each processor state change. The data log analysis computing system instance may parses each of these entries to obtain processor state data for each event identified through the index file.

The data log analysis computing system instance may generate, using the data garnered from the processor state data logs, a file that includes the data in a format, such as a CSV format, that may be used by the data processing datastore. The data log analysis computing system instance may transmit 710 this data to the data stream service, which may provide the data to the data processing datastore. This may cause the data processing datastore to utilize this data to generate one or more reports that may be of use to customers of the virtual computer system service to evaluate each event and address any issues related to these events.

Figure 8:
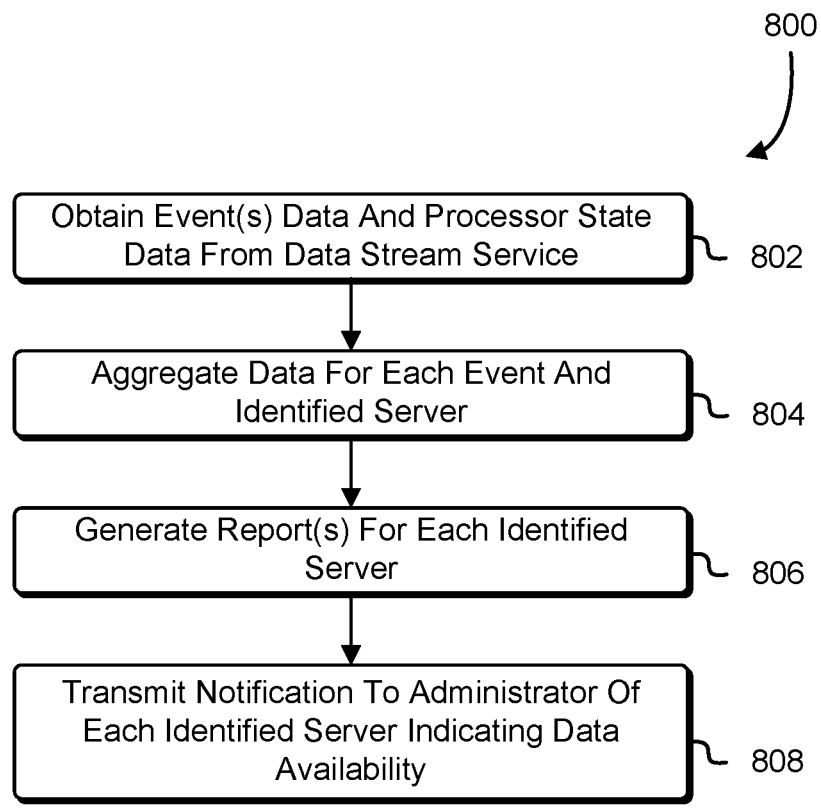
FIG. 8 shows an illustrative example of a process for aggregating data for each identified event for each virtual computing system server in accordance with at least one embodiment.

As noted above, the computing resource service provider may include a data processing datastore, which may obtain the event data and processor state data for each identified event from a data stream service. Through the data stream service, the data processing datastore may obtain the data in real-time. Alternatively, a virtual machine instance diagnostics datastore may transmit the data to the data stream service, which may provide the data to the data processing datastore periodically or in response to a triggering event, such as obtaining all data corresponding to events specified in a particular index file. The data processing datastore may utilize the data from the data stream service to generate one or more reports that may enable customers of the virtual computer system service to evaluate the events and identify any issues associated with these events. Accordingly, FIG. 8 shows an illustrative example of a process 800 for aggregating data for each identified event for each virtual computing system server in accordance with at least one embodiment. The process 800 may be performed by the aforementioned data processing datastore.

As the data stream service receives data from the index analysis computing system instances and the data log analysis computing system instances, the data stream service may provide the data in real-time to the data processing datastore for aggregation and processing. The data processing datastore may obtain 802 the event data and processor state data for various events through the data stream service and aggregate 804 the data according to each event identified, to each individual virtual computing system server, and to each virtual machine instance instantiated using the virtual computing system servers. For instance, the obtained data may specify hardware information for each virtual computing system server, as well as unique timestamps corresponding to each event identified through the data log index file. Further, the data may include a virtual machine instance identifier for each entry. Thus, the data processing datastore may utilize this additional information specified in the obtained data to aggregate the data according to the event, virtual computing system server, and virtual machine instance.

The data processing datastore may use the aggregated data to generate 806 one or more reports for each identified virtual computing system server of the virtual computer system service. These one or more reports may include pictographic representations of the data, such as bar graphs, pie graphs, histograms, and the like that may be viewed by customers of the virtual computer system service for analytical and statistical purposes. Additionally, or alternatively, these one or more reports may be generated in a format that may be used by other computing resource services. For instance, if a virtual computing system server is utilized by another computing resource service, the data processing datastore may generate one or more reports in a format that the other computing resource service uses. Thus, the computing resource service may decode the reports and utilize the reports for its purposes.

In some embodiments, the data processing datastore will access the virtual computer system service to identify administrators and other managers of the various virtual computing system servers maintained by the virtual computer system service. Additionally, the data processing datastore may identify the administrators or other managers of each virtual machine instance instantiated on to the virtual computing system servers. The data processing datastore may utilize this information to transmit 808 a notification to an administrator or manager of each identified virtual computing system server and virtual machine instance to indicate that one or more reports are available for their consumption. This enables these administrators and managers of the virtual computing system servers and the virtual machine instances to access the data processing datastore via an interface to access the one or more reports. This may allow the administrators and managers of the servers and virtual machine instances to evaluate each report, identify any issues associated with the events recorded, and perform any operations necessary to address these issues.

Figure 9:
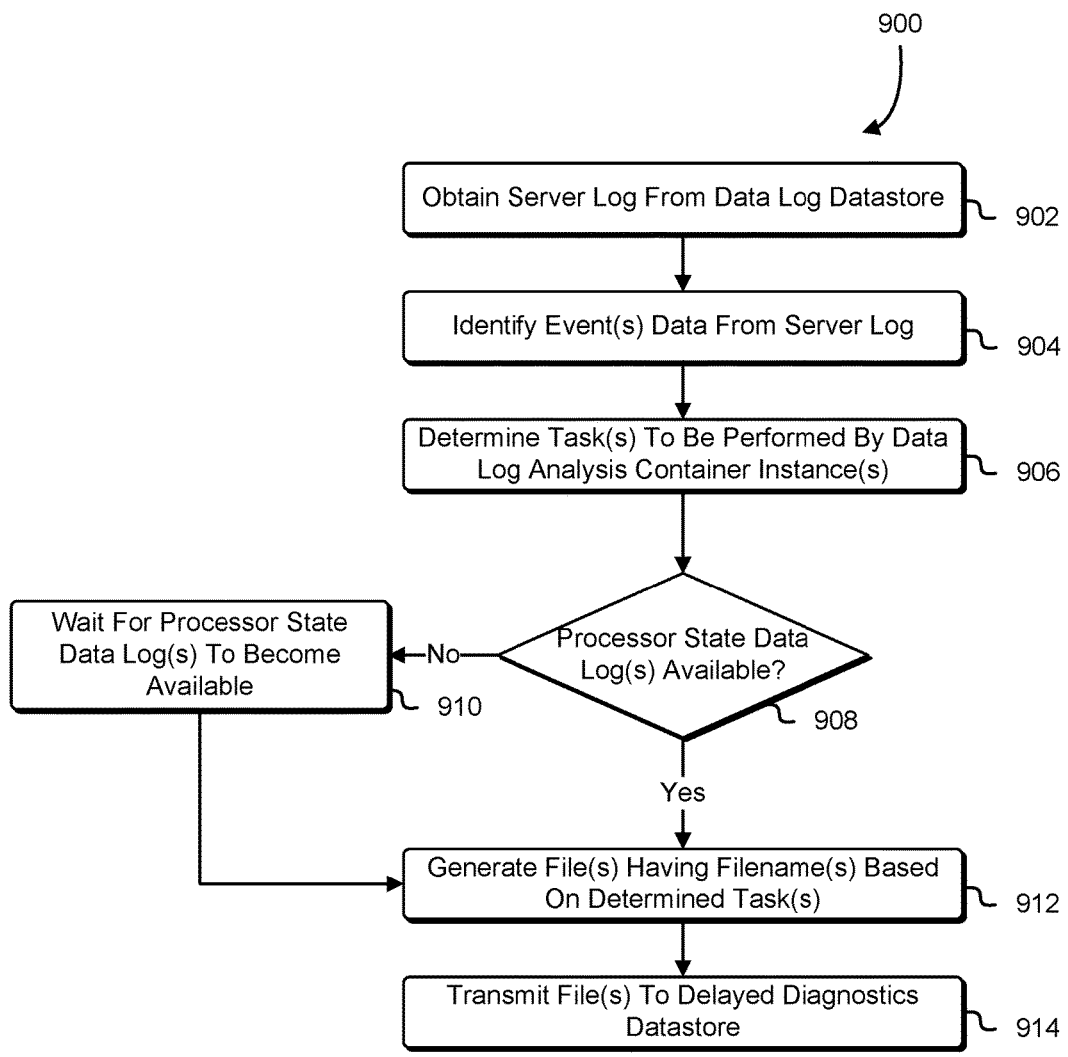
FIG. 9 shows an illustrative example of a process for generating one or more files each having a filename based at least in part on the tasks that are to be performed by the data log analysis computing system instances in accordance with at least one embodiment.

As noted above, the index analysis computing system instances may determine one or more tasks that may be performed by the data log analysis computing system instances by evaluating the log index file from the log index datastore. These tasks may correspond to the events identified through the index file and may cause the data log analysis computing system instances to obtain the processor state data logs from the virtual machine instance data log datastore to obtain data necessary to complete the assigned tasks. To provide these tasks to the data log analysis computing system instances, the index analysis computing system instances may generate a null file that has a filename, within which is encoded the one or more tasks that are to be performed. Accordingly, FIG. 9 shows an illustrative example of a process 900 for generating one or more files each having a filename based at least in part on the tasks that are to be performed by the data log analysis computing system instances in accordance with at least one embodiment. The process 900 may be performed by any index analysis computing system instance, which may utilize the log index file from the log index datastore to identify one or more events and tasks that are to be performed in response to each identified event.

As with the process 600 described above in connection with FIG. 6, an index analysis computing system instance may parse the entries of an index file to identify a virtual computing system server log that may be stored within a virtual machine instance data log datastore. The index analysis computing system instance may access the datastore to obtain 902 the virtual computing system server log. The index analysis computing system instance may parse the log to identify 904 any events that may have been encountered by the virtual computing system server and/or any of the virtual machine instances that utilize the virtual computing system server. If the index analysis computing system instance identifies any events, the index analysis computing system instance may obtain data corresponding to each of these events, including the timestamp at which the event occurred and an identifier for each virtual machine instance that encountered the event.

The index analysis computing system instance may evaluate the data garnered from the index file and the virtual computing system server log to determine 906 what tasks are to be performed by one or more data log analysis computing system instances. For example, the index analysis computing system instance may utilize the obtained data to determine a time at which processor state data for the target virtual computing system server or virtual machine instances may become available for processing. The index analysis computing system instance may also use the obtained data to determine one or more conditions for which the tasks are to be performed. For example, the one or more conditions may include a determination as to whether the tasks have been previously performed, whether there are other sources of data that may be used to compile the processor state data, the time at which the processor state data is available (as described above), and the like. Additionally, the index analysis computing system instance may identify additional information that may be needed to identify the correct data logs from the virtual machine instance data log datastore that can be used to obtain data for a particular event. The additional information may further include information concerning the event to enable the data log analysis computing system instance to associate the data garnered from the virtual computing system server log with the data obtained from the other data logs.

The index analysis computing system instance may evaluate the server log to determine whether the processor state data logs 908 that are required to perform the one or more tasks are available. For instance, the processor state data logs may not be available until a certain amount of time after creation of the server log. Thus, the index analysis computing system instance may calculate the expected time at which the processor state data logs will be available for use. Alternatively, the data log index may specify when the processor state data logs will be available. The index analysis computing system instance may compare the present time to the time specified in the data log index or calculated by the index analysis computing system instance to determine if the processor state data logs are available. If the processor state data logs are not available, the index analysis computing system instance may wait 910 for the processor state data logs to become available before proceeding.

However, if the processor state data logs are available, the index analysis computing system instance may generate 912 or more files having file names based at least in part on the determined tasks. For instance, based at least in part on the information from the virtual computing system server log and the index file, as well as the tasks identified, the index analysis computing system instance may generate one or more null files that have filenames based at least in part on the determined tasks. The index analysis computing system instance may access a task database that includes a key-value store for codes corresponding to different tasks that may be performed. Further, the index analysis computing system instance may utilize one or more established standards to determine additional components of the filename that may be used to identify the parameters of the tasks to be performed. For instance, the index analysis computing system instance may utilize a two-digit numerical set of characters to specify a time at which the processor state data logs may be available for consumption. Further, a portion of the filename may be a hash of the identifier for the virtual computing system server or virtual machine instance for which the data is to be obtained. The index analysis computing system instance may utilize these components of the filename to generate the filename for the null file that may be used to identify the tasks to be performed. The index analysis computing system instance may transmit 914 this null file to a delayed diagnostics datastore, which may provide the null file to a scheduler computing system instance, which may decode the filename of null file to identify the tasks to be performed.

Figure 10:
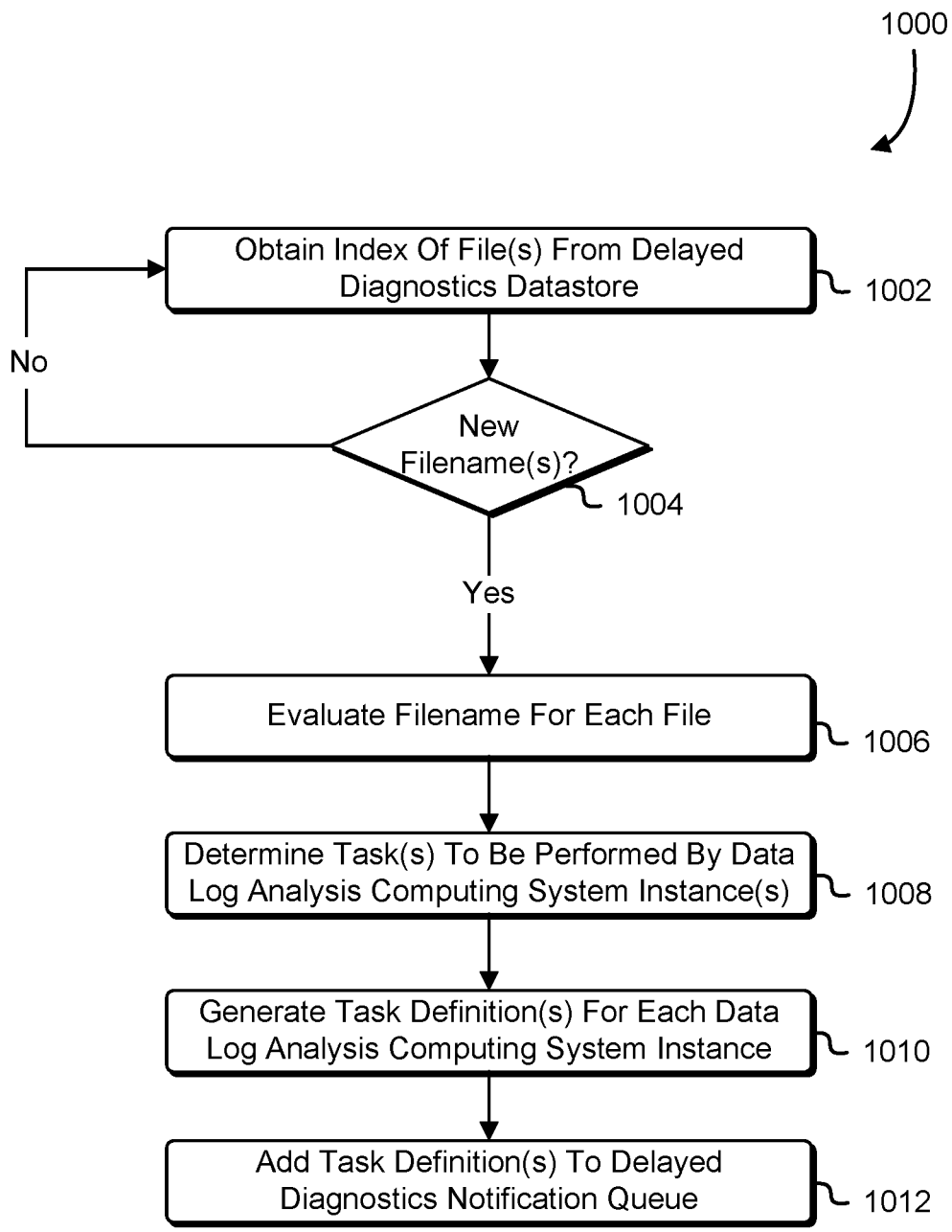
FIG. 10 shows an illustrative example of a process for evaluating a filename of a file obtained from a data store to determine the tasks to be performed by the one or more processor state computing system instances in accordance with at least one embodiment.

As noted above, the virtual computer system service or the computing resource service provider itself may provision a scheduler computing system instance that may process incoming null files from the delayed diagnostics datastore to determine tasks to be performed by the data log analysis computing system instances. The scheduler computing system instance may evaluate the filename of an incoming null file to identify the tasks that are to be performed. Based at least in part on these identified tasks, the scheduler computing system instance may generate task definitions files for the data log analysis computing system instances. Accordingly, FIG. 10 shows an illustrative example of a process 1000 for evaluating a filename of a file obtained from a data store to determine the tasks to be performed by the one or more processor state computing system instances in accordance with at least one embodiment. The process 1000 may be performed by the aforementioned scheduler computing system instance, which may process incoming null files from the delayed diagnostics datastore.

In an embodiment, the scheduler computing system instance receives a notification from the delayed diagnostics datastore indicating that one or more new null files have been added to the delayed diagnostics datastore by an index analysis computing system instance. The scheduler computing system instance, in response to the notification from the delayed diagnostics datastore, may obtain 1002 an index of the new null files from the delayed diagnostics datastore. The index of null files may specify a filename for each of the null files stored in the delayed diagnostics datastore, along with other information that can be used to determine whether the filename has been evaluated. In some instances, the scheduler computing system instance may periodically access the delayed diagnostics datastore to determine whether any new null files have been added. If so, the scheduler computing system instance may obtain the index for these null files.

The scheduler computing system instance may evaluate the index for these null files to determine 1004 whether the index specifies any new filenames that have not been processed by the scheduler computing system instance. The scheduler computing system instance may maintain a record of processed filenames and, for each filename, a corresponding timestamp denoting a time at which the filename was processed. The scheduler computing system instance may evaluate the index to identify, for each filename, a time at which the null file having the filename was added to the delayed diagnostics datastore. Based at least in part on this timestamp, the scheduler computing system instance may perform its determination as to whether there are any new filenames to be processed. If the index does not specify any new filenames that can be processed, the scheduler computing system instance may continue to monitor the delayed diagnostics datastore to obtain the index as it is updated by the delayed diagnostics datastore in response to receiving new files.

If the index specifies one or more new filenames, the scheduler computing system instance may evaluate 1006 the filename for each file to determine 1008 what tasks are to be performed by the one or more data log analysis computing system instances. For instance, the scheduler computing system instance may access the task database and utilize the placement of the characters for the filename to identify the corresponding tasks. Additionally, the scheduler computing system instance may utilize the filename to identify one or more parameters for these tasks. For instance, the scheduler computing system instance may evaluate a particular string of characters of the filename to determine a time at which the tasks are to be performed. The filename may also be used to identify the one or more processor state data logs that are to be obtained and analyzed by these data log analysis computing system instances.

Based at least in part on the tasks identified through the filename, as well as the parameters for each of these tasks, the scheduler computing system instance may generate 1010 one or more task definitions for each data log analysis computing system instance that may be provisioned to access the virtual machine instance data log datastore. These task definitions files may specify the tasks that are to be performed and the parameters for performance of these tasks. Further, the task definitions files may specify other information that a data log analysis computing system instance may need to include in the data to be provided to the data stream service. For example, a data definitions file may specify information about an event such that the data obtained by the data log analysis computing system instance may be associated with the event data for the event obtained by the index analysis computing system instance. The scheduler computing system instance may add 1012 these task definitions files to the delayed diagnostics notification subject, which may trigger the launch of the one or more data log analysis computing system instances.

Figure 11:
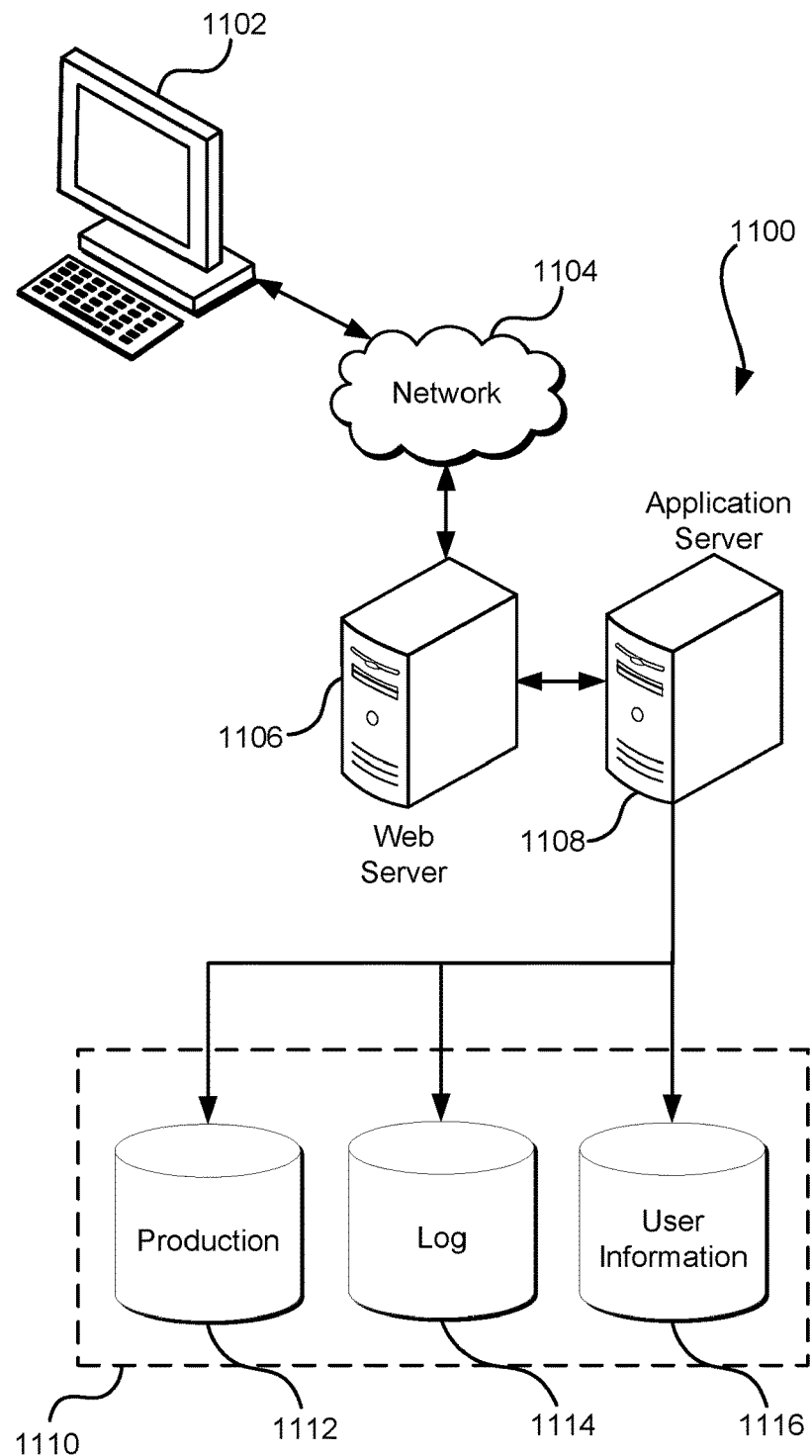
FIG. 11 illustrates an environment in which various embodiments can be implemented.

FIG. 11 illustrates aspects of an example environment 1100 for implementing aspects in accordance with various embodiments. As will be appreciated, although a web-based environment is used for purposes of explanation, different environments may be used, as appropriate, to implement various embodiments. The environment includes an electronic client device 1102, which can include any appropriate device operable to send and/or receive requests, messages, or information over an appropriate network 1104 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly addressable communications network, as the environment includes a web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 1102 and the application server 1108, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 1110 can include several separate data tables, databases, data documents, dynamic data storage schemes, and/or other data storage mechanisms and media for storing data relating to a particular aspect of the present disclosure. For example, the data store illustrated may include mechanisms for storing production data 1112 and user information 1116, which can be used to serve content for the production side. The data store also is shown to include a mechanism for storing log data 1114, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. The application server 1108 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1102. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python or TCL, as well as combinations thereof. The server(s) may also include database servers, including without limitation those commercially available from Oracle®, Microsoft®, Sybase and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: $\{A\}$, $\{B\}$, $\{C\}$, $\{A, B\}$, $\{A, C\}$, $\{B, C\}$, $\{A, B, C\}$. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system, comprising:
   one or more processors; and
   memory that stores computer-executable instructions that, if executed, cause the system to:
      implement an index analysis computing system instance that:
         obtains, from a virtual machine instance data log datastore, a data log for a virtual computing system server, the data log specifying data associated with one or more events encountered by the virtual computing system server;
         identifies, based at least in part on the data associated with the one or more events, one or more tasks to be performed to obtain processor state data for the virtual computing system server associated with the one or more events;
         generates, based at least in part on the one or more tasks to be performed, a metadata for a file, the metadata representing the one or more tasks;
         stores the file within a second datastore; and
         updates an index of the datastore to specify the metadata for the file; and
      implement a scheduler computing system instance that:
         obtains the index of the second datastore;
         identifies the metadata for the file;
         decodes the metadata for the file to identify the one or more tasks to be performed;
         generates, based at least in part on the one or more tasks to be performed, a task definitions file specifying the one or more tasks to be performed; and
         provides the task definitions file so that one or more data logs can be obtained to perform the one or more tasks.

2. The system of claim 1, wherein the task definitions file indicates a time at which the one or more tasks are to be performed and information required to obtain the one or more data logs.

3. The system of claim 1, wherein the scheduler computing system instance further transmits the task definitions file to a diagnostics notification subject to which the data log analysis computing system instance is subscribed to provide the task definitions file to the data log analysis computing system instance.

4. The system of claim 1, wherein the computer-executable instructions further cause the system to implement an analysis computing system instance that:
   obtains the task definitions file;
   determines the one or more tasks to be performed;
   accesses the virtual machine instance data log datastore to obtain the one or more data logs;
   performs the one or more tasks to generate processor state information for the virtual computing system server; and
   transmits the processor state information for the virtual computing system server to a data processing datastore to be processed.

5. A computer-implemented method, comprising:
   under the control of one or more computer systems configured with executable instructions,
      obtaining a data log for a virtual computing system server, the data log specifying data associated with one or more events encountered by the virtual computing system server;
      identifying, based at least in part on the data associated with the one or more events, one or more tasks to be performed to obtain processor state data for the virtual computing system server associated with the one or more events;
      generating, based at least in part on the one or more tasks to be performed, a metadata for a file, the metadata representing the one or more tasks;
      storing the file;
      identifying the one or more tasks based at least in part on the metadata for the file; and
      performing the one or more tasks.

6. The computer-implemented method of claim 5, wherein the file is a null file having no data therein.

7. The computer-implemented method of claim 5, wherein the metadata for the file further represents one or more conditions for which the one or more tasks are to be performed.

8. The computer-implemented method of claim 5, wherein the data log for the virtual computing system server is obtained in response to a notification indicating presence of an index for the virtual computing system server that is used to identify the data log.

9. The computer-implemented method of claim 5, wherein the method further comprises updating an index of a datastore to specify the metadata for the file to enable identification of the one or more tasks based at least in part on the metadata for the file.

10. The computer-implemented method of claim 5, wherein the one or more tasks include accessing a datastore to obtain processor state data logs to obtain the processor state data for the virtual computing system server associated with the one or more events.

11. The computer-implemented method of claim 5, wherein the metadata for the file further represents information associated with the one or more events to cause data generated as a result of performance of the one or more tasks to be aggregated with the data associated with one or more events.

12. The computer-implemented method of claim 5, wherein the method further comprises specifying, within a datastore usable to decode the metadata, the one or more tasks and the metadata generated based at least in part on the one or more tasks.

13. A non-transitory computer-readable storage medium having stored thereon executable instructions that, as a result of being executed by one or more processors of a computer system, cause the computer system to at least:
    obtain a data log for a virtual computing system server;
    identify, based at least in part on data associated with one or more events specified in the data log, one or more tasks to be performed associated with the one or more events;
    create a file having a metadata based at least in part on the one or more tasks to be performed, the metadata representing the one or more tasks; and
    generate a task definitions file based at least in part on the one or more tasks represented in the metadata for the file.

14. The non-transitory computer-readable storage medium of claim 13, wherein the instructions further cause the computer system to:
    receive a notification indicating presence of an index for the virtual computing system server; and
    utilize the index for the virtual computing system server to determine a storage location of the data log for the virtual computing system server.

15. The non-transitory computer-readable storage medium of claim 14, wherein a datastore wherein the index is stored transmits the notification in response to receiving the index from the virtual computing system server.

16. The non-transitory computer-readable storage medium of claim 13, wherein the metadata for the file is a filename of the file.

17. The non-transitory computer-readable storage medium of claim 13, wherein the metadata further represents information associated with the one or more events to cause data generated as a result of performance of the one or more tasks to be processed with the data associated with one or more events.

18. The non-transitory computer-readable storage medium of claim 13, wherein the metadata further represents one or more conditions for which the one or more tasks can be performed by a data log analysis computing system instance that obtains data logs to perform the one or more tasks.

19. The non-transitory computer-readable storage medium of claim 13, wherein the one or more tasks include accessing a datastore to obtain one or more processor state data logs from a datastore to obtain processor state data for the virtual computing system server associated with the one or more events.

20. The non-transitory computer-readable storage medium of claim 13, wherein the instructions further cause the computer system to update a datastore that is used to decode the metadata to specify that the metadata corresponds to the one or more tasks.

* * * * *